(12) United States Patent
Sato

(10) Patent No.: US 6,867,925 B1
(45) Date of Patent: Mar. 15, 2005

(54) ZOOM LENS

(75) Inventor: Masae Sato, Hachioji (JP)

(73) Assignee: Konica Corporation, Tokyo (JP)

( * ) Notice: Subject to any disclaimer, the term of this patent is extended or adjusted under 35 U.S.C. 154(b) by 1008 days.

(21) Appl. No.: 09/585,576

(22) Filed: Jun. 2, 2000

(30) Foreign Application Priority Data

Jun. 4, 1999 (JP) ............................................ 11-158093

(51) Int. Cl.$^7$ ............................................. G02B 15/20
(52) U.S. Cl. ......................... 359/690; 359/687; 359/684
(58) Field of Search .............................. 359/690, 687, 359/684

(56) References Cited

U.S. PATENT DOCUMENTS

| | | | | |
|---|---|---|---|---|
| 4,299,454 A | * | 11/1981 | Betensky | ..................... 359/687 |
| 4,763,998 A | * | 8/1988 | Tsuji et al. | ................... 359/687 |
| 5,694,253 A | * | 12/1997 | Shibayama | .................. 359/690 |
| 6,028,717 A | * | 2/2000 | Kohno et al. | ................ 359/690 |
| 6,118,592 A | * | 9/2000 | Kohno et al. | ................ 359/686 |
| 6,191,895 B1 | * | 2/2001 | Arimoto et al. | ............. 359/686 |
| 6,633,437 B1 | * | 10/2003 | Hoshi et al. | ................. 359/687 |
| 2002/0097503 A1 | * | 7/2002 | Kohno et al. | ................ 359/690 |

* cited by examiner

Primary Examiner—Scott J. Sugarman
Assistant Examiner—Deborah A. Raizen
(74) Attorney, Agent, or Firm—Finnegan, Henderson, Farabow, Garrett & Dunner, L.L.P.

(57) ABSTRACT

A zoom lens to form an image of an object with variable magnification between a shortest focal length and a longest focal length, is provided with a first lens group having a positive refracting power; a second lens group positioned closer to the image than the first lens group and having a negative refracting power; and a third lens group positioned closer to the image than the second lens group and having a positive refracting power. When the magnification is changed from the shortest focal length to the longest focal length, the third lens group is shifted toward the object and the first lens group and the second lens group are shifted in such a manner that a distance between the first lens group and the second lens group is increased and a distance between the second group and the third group is decreased. The third lens group comprises at least a single positive lens and at least a single negative lens. A variable magnification ratio of the zoom lens is four times or more.

42 Claims, 12 Drawing Sheets

ZOOM LENS

BACKGROUND OF THE INVENTION

The present invention relates to a zoom lens, and in particular, to a zoom lens having a high magnifying power and a wide angle which is suitable for an electronic still camera or a video camera employing a solid image pick-up element such as CCD. In particular, it relates to a zoom lens which fits a digital still camera having a large quantity of pixels such as a million pixels or more.

As a zoom lens for a solid image pick-up element such as CCD which has a ratio of variable power of 4 times or more and a wide angle with a half angle of view of 35° or more, there are known a 3-group zoom lens composed of a first lens group with a positive refracting power, a second lens group with a negative refracting power and a third lens group with a positive refracting power disclosed in TOKKAIHEI No. 11-2762, and a 4-group zoom lens composed of a first lens group with a positive refracting power, a second lens group with a negative refracting power and a third lens group with a positive refracting power disclosed in TOKKAIHEI Nos. 7-20381, 7-275361, 6-148521 and 6-148520.

However, though the zoom lens disclosed in TOKKAIHEI No. 11-2762 is a zoom lens with variable magnifications of 5–8 times wherein the number of constituent lenses is made to be small to the utmost, it is difficult to correct various aberrations so that the zoom lens may be used for a high pixel digital still camera having pixels in quantity exceeding a million.

On the other hand, those disclosed in TOKKAIHEI Nos. 7-275361, 6-148521 and 6-148520 represent a zoom lens with a ratio of variable power of 10 or more, and it is still difficult to use this zoom lens for a high image quality digital camera having not less than one million pixels, because distortion and magnification chromatic aberration at an end of a short focal length are not corrected sufficiently.

SUMMARY OF THE INVENTION

It is intended in the invention to provide a zoom lens having sufficient image forming capacity. Further, an object of the invention is to provide a zoom lens which is of high magnifying power and has sufficient image forming capacity. Furthermore, an object of the invention is to provide a zoom lens which is of high magnifying power and of wide angle and yet has sufficient image forming capacity. Still further, an object of the invention is to provide a zoom lens which is used in a digital still camera employing a million or more of solid image pick-up elements such as CCD, and is of high magnifying power and of wide angle and yet has sufficient image forming capacity.

The objects stated above can be attained by either one of the following structures.

(Structure 1) A 3-group zoom lens having therein a first lens group having positive refracting power, a second lens group having negative refracting power and a third lens group having positive refracting power arranged in this order from the object side, wherein, on the occasion of varying magnifying power from an end of a short focal length (the shortest focal length) to an end of a long focal length (the longest focal length), at least the second lens group moves and the third lens group moves toward the object side so that a distance between the first lens group and the second lens group may be increased and a distance between the second lens group and the third lens group may be decreased, the first lens group includes at least one negative lens and one positive lens, and the following conditional expression is satisfied.

$$4.5 < f_1/f_W < 20 \quad (1)$$

$$2.9 < \beta_{3T}/\beta_{3W} < 8 \quad (2)$$

wherein, $f_1$: Focal length of the first lens group $f_W$: Focal length of the zoom lens at an end of short focal length $\beta_{3W}$: Paraxial lateral magnification of the third lens group at an end of short focal length $\beta_{3T}$: Paraxial lateral magnification of the third lens group at an end of long focal length (Structure 2) The zoom lens according to Structure 1 above wherein the following conditional expression is satisfied.

$$2.9 < \beta_{3T}/\beta_{3W} < 6 \quad (3)$$

wherein, $\beta_{3W}$: Paraxial lateral magnification of the third lens group at an end of short focal length $\beta_{3T}$: Paraxial lateral magnification of the third lens group at an end of long focal length (Structure 3) The zoom lens according to Structure 1 or the Structure 2 above wherein, on the occasion of varying magnifying power from an end of a short focal length to an end of a long focal length, the first lens group moves toward the image side and then, moves toward the object side.

(Structure 4) The zoom lens according to Structure 1, the Structure 2 or the Structure 3 above wherein the third lens group has therein (3-a)$^{th}$ lens group having positive refracting power and (3-b)$^{th}$ lens group having positive refracting power, and focusing is carried out by moving the (3-b)$^{th}$ lens group, and the following conditional expression is satisfied.

$$0.25 < f_{3-a}/f_{3-b} < 0.7 \quad (4)$$

wherein, $f_{3\text{-}a}$: Focal length of the (3-a)$^{th}$ lens group $f_{3\text{-}b}$: Focal length of the (3-b)$^{th}$ lens group (Structure 5) A 4-group zoom lens having therein a first lens group having positive refracting power, a second lens group having negative refracting power, a third lens group having positive refracting power and a fourth lens group having positive refracting power in this order from the object side, wherein, on the occasion of varying magnifying power from an end of a short focal length to an end of a long focal length, at least the second lens group moves, the third lens group moves toward the object side and the fourth lens group moves toward to the object side so that a distance between the first lens group and the second lens group may be increased and a distance between the second lens group and the third lens group may be decreased, and the following conditional expression is satisfied.

$$1.5 < f_1/f_W < 20 \quad (5)$$

$$3.3 < \beta_{34T}/\beta_{34W} < 8 \quad (6)$$

wherein, $f_1$: Focal length of the first lens group $f_W$: Focal length of the zoom lens at an end of short focal length $\beta_{34W}$: Paraxial lateral magnification of the combination of the third lens group and the fourth lens group at an end of short focal length $\beta_{34T}$: Paraxial lateral magnification of the combination of the third lens group and the fourth lens group at an end of long focal length (Structure 6) The zoom lens according to Structure 5 above wherein the following conditional expression is satisfied.

$$8.0<f_1/f_W<20 \tag{7}$$

wherein, $f_1$: Focal length of the first lens group $f_W$: Focal length of the zoom lens at an end of short focal length (Structure 7) The zoom lens according to Structure 5 or Structure 6 above wherein the following conditional expression is satisfied.

$$3.3<\beta_{34T}/\beta_{34W}< \tag{8}$$

wherein, $\beta_{34W}$: Paraxial lateral magnification of the combination of the third lens group and the fourth lens group at an end of short focal length of the zoom lens $\beta_{34T}$: Paraxial lateral magnification of the combination of the third lens group and the fourth lens group at an end of long focal length of the zoom lens (Structure 8) The zoom lens according to either one of Structures 5–7, wherein the first lens group includes at least one negative lens and one positive lens.

(Structure 9) The zoom lens according to either one of Structures 5–8, wherein on the occation of varying magnifying power from an end of a short focal length to an end of along focal length, the first lens group moves toward the image side and then, moves toward the object side.

(Structure 10) the zoom lens according to either one of Structures 5–9 above, wherein focusing is carried out by moving the fourth lens group, and the following conditional expression is satisfied.

$$0.25<f_3/f_4<0.7 \tag{9}$$

wherein, $f_3$: Focal length of the third lens group $f_4$: Focal length of the fourth lens group (Structure 11) A zoom lens represented by a 3-group zoom lens having therein a first lens group having positive refracting power, a second lens group having negative refracting power and a third lens group having positive refracting power from the object side, or by a 4-group zoom lens having therein a first lens group having positive refracting power, a second lens group having negative refracting power, a third lens group having positive refracting power and a fourth lens group having positive refracting power from the object side, wherein, on the occasion of varying magnifying power from an end of a short focal length to an end of a long focal length, at least the second lens group moves so that a distance between the first lens group and the second lens group may be increased and a distance between the second lens group and the third lens group may be decreased, the second lens group is structured to include three negative lenses and one positive lens in this order from the object side, and the following conditional expression is satisfied.

$$32°<\omega_W<50° \tag{10}$$

wherein, $\omega_W$: Half angle of view at an end of short focal length (Structure 12) The zoom lens according to Structure 11 above wherein the following conditional expression is satisfied.

$$1.5<f_1/f_W<20 \tag{1}$$

(Structure 13) A 3-group zoom lens having therein a first lens group having positive refracting power, a second lens group having negative refracting power and a diaphragm and a third lens group having positive refracting power in this order from the object side, wherein, on the occasion of varying magnifying power from an end of a short focal length to an end of a long focal length, at least the second lens group moves and the third lens group moves toward the object side so that a distance between the first lens group and the second lens group may be increased and a distance between the second lens group and the third lens group may be decreased, and a diameter of an open aperture of the diaphragm is made to be greater, as magnifying power is varied from an end of short focal length to an end of a long focal length.

(Structure 14) A 3-group zoom lens having therein a first lens group having positive refracting power, a second lens group having negative refracting power and a diaphragm and a third lens group having positive refracting power in this order from the object side, wherein, on the occasion of varying magnifying power from an end of a short focal length to an end of a long focal length, at least the second lens group moves and the third lens group moves toward the object side so that a distance between the first lens group and the second lens group may be increased and a distance between the second lens group and the third lens group may be decreased, and the following conditional expression is satisfied and a diameter of an open aperture of the diaphragm is made to be greater, as magnifying power is varied from an end of short focal length to an end of a long focal length.

$$2.9<\beta_{3T}/\beta_{3W}<8 \tag{11}$$

wherein, $\beta_{3W}$: Paraxial lateral magnification of the third lens group at an end of short focal length $\beta_{3T}$: Paraxial lateral magnification of the third lens group at an end of long focal length (Structure 15) The zoom lens according to Structure 14 above, wherein the following conditional expression is satisfied.

$$2.9<\beta_{3T}/\beta_{3W}<6 \tag{12}$$

wherein, $\beta_{3W}$: Paraxial lateral magnification of the third lens group at an end of short focal length $\beta_{3T}$: Paraxial lateral magnification of the third lens group at an end of long focal length (Structure 16) A 4-group zoom lens having therein a first lens group having positive refracting power, a second lens group having negative refracting power, a diaphragm and a third lens group having positive refracting power and a fourth lens group having positive refracting power in this order from the object side, wherein, on the occasion of varying magnifying power from an end of a short focal length to an end of a long focal length, at least the second lens group moves, the third lens group moves toward the object 2.1 side and the fourth lens group moves toward the object side so that a distance between the first lens group and the second lens group may be increased and a distance between the second lens group and the third lens group may be decreased, and a diameter of an open aperture of the diaphragm is made to be greater, as magnifying power is varied from an end of short focal length to an end of a long focal length.

(Structure 17) A 4-group zoom lens having therein a first lens group having positive refracting power, a second lens group having negative refracting power, a diaphragm and a third lens group having positive refracting power and a fourth lens group having positive refracting power in this order from the object side, wherein, on the occasion of varying magnifying power from an end of a short focal length to an end of a long focal length, at least the second lens group moves, the third lens group moves toward the object side and the fourth lens group moves toward the object side so that a distance between the first lens group and the second lens group may be increased and a distance between the second lens group and the third lens group may be decreased, and the following conditional expression is satisfied and a diameter of an open aperture of the diaphragm is made to be greater, as magnifying power is varied from an end of short focal length to an end of a long focal length.

$$3.3<\beta_{34T}/\beta_{34W}<8 \quad (13)$$

wherein, $\beta_{34W}$: Paraxial lateral magnification of the combination of the third lens group and the fourth lens group at an end of short focal length $\beta_{34T}$: Paraxial lateral magnification of the combination of the third lens group and the fourth lens group at an end of long focal length (Structure 18) The zoom lens according to Structure 17 above, wherein the following conditional expression is satisfied.

$$3.3<\beta_{34T}/\beta_{34W}<6 \quad (14)$$

wherein, $\beta_{34W}$: Paraxial lateral magnification of the combination of the third lens group and the fourth lens group at an end of short focal length $\beta_{34T}$: Paraxial lateral magnification of the combination of the third lens group and the fourth lens group at an end of long focal length Next, each structure stated above will be explained as follows.

A zoom lens of the invention has therein a first lens group having positive refracting power, a second lens group which is located to be closer to an object than the first lens group and has negative refracting power, and a third lens group which is located to be closer to an object than the second lens group and has positive refracting power. Further, on the occasion of varying magnifying power from an end of a short focal length to an end of a long focal length, the second lens group moves and the third lens group moves toward an object so that a distance between the first lens group and the second lens group may be increased and a distance between the second lens group and the third lens group may be decreased. Incidentally, it is preferable that the first lens group also moves when varying the magnifying power. In the case of high ratio of variable power, in particular, it is preferable that the first lens group also moves. On the occasion of varying magnifying power from an end of a short focal length to an end of a long focal length, it is preferable that the first lens group moves toward the image side, and then, moves toward the object side. The third lens group has at least one positive lens and at least one negative lens. Incidentally, it is preferable that a ratio of variable power of the zoom lens is not less than 4. When the ratio of variable power of the zoom lens is not less than 5, the effect of the invention is more remarkable, which is preferable.

A lens group mentioned in the invention means "a group of one or plural lenses each showing the same movement when varying the magnifying power". Incidentally, in the case of focusing, plural lenses in the same lens group may show different movements. Further, the variable magnification ratio can be represented by the formula of (a focal length at an end of a long focal length/a focal length at an end of a short focal length).

It is preferable that the first lens group includes at least one negative lens and one positive lens. Owing to this structure, it is possible to make image forming capacity to be excellent even in the case of a wide-angle zoom lens.

Further, it is preferable that the following conditional expression is satisfied.

$$4.5<f_1/f_W<20$$

wherein, $f_1$: Focal length of the first lens group $f_W$: Focal length of the zoom lens group at an end of short focal length $$2.9<\beta_{3T}/\beta_{3W}<8$$

wherein, $\beta_{3T}$: Paraxial lateral magnification of the third lens group at an end of long focal length $\beta_{3W}$: Paraxial lateral magnification of the third lens group at an end of short focal length The further preferable is that the following conditional expression is satisfied.

$$2.9<\beta_{3T}/\beta_{3W}<6$$

The zoom lens may have four lens groups or more. For example, the preferable is to have a fourth lens group which is located to be closer to the image side than the third lens and has positive refracting power. When the positive fourth lens group is provided, it is preferable that the fourth lens group also moves toward the object side when varying magnifying power from an end of a short focal length to an end of a long focal length. The further preferable is to satisfy the following expression $$0.25<f_3/f_4<0.7$$

wherein, $f_3$: Focal length of the third lens group $f_4$: Focal length of the fourth lens group The further preferable is that the following conditional expression is satisfied $$3.3<\beta_{34T}/\beta_{34W}<8$$

wherein, $\beta_{34T}$: Paraxial lateral magnification of the combination of the third lens group and the fourth lens group at an end of long focal length $\beta_{34W}$: Paraxial lateral magnification of the combination of the third lens group and the fourth lens group at an end of short focal length The more preferable is to satisfy the following expression.

$$3.3<\beta_{34T}/\beta_{34W}<6$$

Further, when the fourth lens group is provided, the preferable is to satisfy the following expression.

$$8.0<f_1/f_W<20$$

Further, when a zoom lens is of a wide-angle, the effect of the invention is more remarkable, which is preferable. To be concrete, the preferable is to satisfy the following expression.

$$32° < \omega_W < 50°$$

wherein, $\omega_W$: Half angle of view at a short focal length

In the case of a wide-angle zoom lens as stated above, it is preferable that the second lens group has at least three negative lenses and at least one positive lens in this order from the object side. This structure makes it possible to obtain a zoom lens having an excellent image forming all capacity without making a lens diameter to be large, even in the case of a wide-angle zoom lens.

In the case of a wide-angle zoom lens as stated above, the preferable is to satisfy the following conditional expression.

$$1.5 < f_1/f_W < 20$$

wherein, $f_1$: Focal length of the first lens group $f_W$: Focal length of the zoom lens at an end of a short focal length A zoom lens of the invention preferably has a diaphragm. In particular, in the case of a zoom lens with a high ratio of variable power of not less than 4 (preferably, 5 or more), it is preferable to have a variable diaphragm. Namely, the preferable is to have a diaphragm wherein a diameter of an open aperture of the diaphragm becomes greater when varying magnifying power from an end of a short focal length to an end of a long focal length. In particular, an F number of a zoom lens at an end of a long focal length is preferably made to be 5 or less. Further, it is preferable that the diaphragm is provided between the second lens group and the third lens group. Incidentally, it may be preferable that the diaphragm is not shifted in the axial direction in the time of varying the magnification.

It is also possible to arrange so that the third lens group has 3-a lens sub-group having positive refracting power and 3-b lens sub-group having positive refracting power, and the 3-b lens sub-group is made to move in the case of focusing.

In this case, the preferable is to satisfy the following conditional expression.

$$0.25 < f_{3-a}/f_{3-b} < 0.7$$

wherein, $f_{3-a}$: Focal length of the 3-a lens sub-group $f_{3-b}$: Focal length of the 3-b lens sub-group Next, a video camera and a digital camera both in the invention will be explained as follows. The video camera of the invention has therein an image pick-up element and a zoom lens of the invention described above. A digital camera of the invention also has therein an image pick-up element and a zoom lens of the invention described above. As the image pick-up element, there are given CCD and CMOS. In particular, in the case of the digital camera, when CCD or CMOS has a million pixels or more, the effect of the invention is more remarkable, which is preferable. In particular, pixels in quantity of 1.3 million or more are preferable.

In Structure 1 above, it was possible to try to provide a zoom lens having sufficient image forming capacity, by using a solid image pick-up element such as CCD with a million or more pixels with a focal length of the first lens group which is set to be relatively long and with a variably magnifying load of the third lens group which is set relatively heavy, and thereby, by applying to a digital still camera having a ratio of variable power of 4 or more and a half angle of view of not less than 350. Further, in a zoom lens with a 3-group structure composed of a first lens group having positive refracting power, a second lens group having negative refracting power and a third lens group having positive refracting power, it was possible to realize a wide angle while keeping high functions, by making the first lens group to include at least one negative lens and one positive lens.

When the conditional expression (1) is satisfied, it is possible to obtain a well-balanced zoom lens wherein a diameter of a front lens is not too large, a total lens length is not too long, and a distortion at an end of a short focal length is not problematic. When the conditional expression (2) is satisfied, it is possible to control distortion at an end of a short focal length and changes in coma-aberration and curvature of the field both are caused when varying the magnifying power.

Further, in Structure 2 above, the load for varying a magnifying power of the third lens group is improved when the conditional expression (3) is satisfied.

Further, in Structure 3 above, when the first lens group moves toward the image side, and then, moves toward the object side, on the occasion of varying magnifying power from an end of a short focal length to an end of a long focal length, it is possible to make a diameter of a front lens to be small. It is also advantageous for correction of aberration, and a wide angle tends to be realized easily.

Further, in Structure 4 above, when focusing is conducted by moving the first lens group toward the object side, a diameter of the front lens is made to be greater. However, when focusing is conducted by moving (3-b)$^{th}$ group, it is possible to prevent that a diameter of the front lens is made to be greater. Further, capacity deterioration caused by focusing can be made less. When the conditional expression (4) is satisfied, it is possible to control aberration deterioration without increasing an amount of movement for focusing, and to obtain sufficient variable power without lengthening the total length of a lens.

When a focal length of the first lens group was established to be relatively long, and a load of variation of magnifying power for a compound of the third lens group and the fourth lens group was set to be relatively much in Structure 5 above, it was possible to provide a zoom lens which has sufficient image forming capacity when applied to a digital still camera employing a solid image pick-up element such as CCD with a million pixels or more and having a ratio of variable power of 4 times or more and a half angle of view of 35° or more. When the conditional expression (5) is satisfied, it is possible to obtain a well-balanced zoom lens wherein a diameter of the front lens is not too large, the total lens length is not too long, and distortion at an end of short focal length is improved. When the conditional expression (6) is satisfied, it is possible to control distortion at an end of short focal length, and to control changes in coma and in curvature of: the field caused by variation of magnifying power.

Further, in Structure 6 above, a focal length of the first lens group is further improved when the conditional expression (7) is satisfied.

Further, in Structure 7 above, the load for varying a magnifying power of the composed third lens group and fourth lens group is further improved when the conditional expression (8) is satisfied.

Further, in Structure 8 above, even in the case of a zoom lens of a 4-group structure composed of a first lens group having positive refracting power, a second lens group having negative refracting power, a third lens group having positive refracting power and a fourth lens group having positive refracting power, it is desirable that the first lens group has a structure to include at least one negative lens and one positive lens, for the purpose of high functions and a wide angle.

Further, in Structure 9 above, when the first lens group moves toward the image side, and then, moves toward the object side, on the occasion of varying magnifying power from an end of a short focal length to an end of a long focal length, it is possible to make a diameter of a front lens to be small. It is also advantageous for correction of aberration, and a wide angle tends to be realized easily.

Further, in Structure 10 above, if a method of focusing is to move the fourth lens group, it is possible to prevent a large diameter of a front lens and to make deterioration of functions caused by focusing to be less. When the conditional expression (9) is satisfied, it is possible to control the worsening of aberration without increasing an amount of movement for focusing, and to obtain sufficient ratio of variable power without lengthening the total lens length.

In Structure 11 above, in the case of a zoom lens having on its forefront the positive refracting power, a luminous flux is inclined greatly after it is refracted by the first lens group, and this phenomenon is remarkable, in particular, at an end of short focal length where an angle of view is large and in the case of a wide angle zoom lens satisfying the conditional expression (10). In the zoom lens of the invention, an inclination of the luminous flux to an optical axis is made to be small by the second lens group so that the luminous flux may pass through the third lens group which is positioned in the rear. When the second lens group is structured to include three negative lenses and one positive lens in this order from the object side, it is possible to minimize sufficiently an inclination of a luminous flux which is out of an optical axis after passing through the second lens group, thereby, a diameter of a front lens can be made small, which is preferable. When the conditional expression (10) is satisfied, transverse chromatic aberration and distortion can be made favorable.

Further, in the Structure 12 above, when the conditional expression (10) is satisfied, it is possible to obtain a well-balanced zoom lens wherein a diameter of a front lens is small, a total lens length is not too long, and distortion at an end of short focal length is made favorable.

In the Structures 13 and 14 above, in a 3-group zoom lens having therein a first lens group having positive refracting power, a second lens group having negative refracting power and a diaphragm and a third lens group having positive refracting power in this order from the object side, wherein, on the occasion of varying magnifying power from an end of a short focal length to an end of a long focal length, at least the second lens group moves and the third lens group moves toward the object side so that a distance between the first lens group and the second lens group may be increased and a distance between the second lens group and the third lens group may be decreased, a position of an exit pupil of the lens is made to be far from an image forming plane, to be suitable for an optical system employing CCD, because a diaphragm is located to precede the third lens group, but an F number at an end of long focal length is made to be large in variation of magnifying power from an end of short focal length to an end of long focal length, if a diameter of a diaphragm is left constant, because the third lens group moves toward the object side. Therefore, if a diameter of an open aperture of the diaphragm is made to be larger on the occasion of variation of magnifying power from an end of short focal length to an end of long focal length, a change of F number at an end of short focal length and at an end of long focal length can be made small, thus, it is possible to prevent an increase of F number at an end of long focal length without making F number at an end of short focal length to be small.

When the conditional expression (11) is satisfied, it is possible to control distortion at an end of short focal length, and changes in coma and curvature of the field both caused by variation of magnifying power, without lengthening the total lens length.

In the case of a zoom lens satisfying the conditional expression (11), a change of F number in the case of a constant diameter of a diaphragm is considerably great. Therefore, when a diameter of an open aperture is made to be greater on the occasion of variation of magnifying power from an end of short focal length to an end of long focal length as stated above, its effect is remarkable, and there can be obtained a zoom lens with high variation of magnifying power wherein aberration at an end of short focal length is corrected properly.

Further, in the Structure 15 above, a load of variation of magnifying power for the third lens group is further improved, if the conditional expression (12) is satisfied.

In the Structures 16 and 17 above, in a 4-group zoom lens having therein a first lens group having positive refracting power, a second lens group having negative refracting power, a diaphragm and a third lens group having positive refracting power and a fourth lens group having positive refracting power in this order from the object side, wherein, on the occasion of varying magnifying power from an end of a short focal length to an end of a long focal length, at least the second lens group moves, the third lens group moves toward the object side, and the fourth lens group moves toward the object side so that a distance between the first lens group and the second lens group may be increased and a distance between the second lens group and the third lens group may be decreased, a position of an exit pupil of the lens is made to be far from an image forming plane, to be suitable for an optical system employing CCD, because a diaphragm is located to precede the third lens group, but an F number at an end of long focal length is made to be large in variation of magnifying power from an end of short focal length to an end of long focal length, if a diameter of a diaphragm is left constant, because the third lens group and the fourth lens group move toward the object side. Therefore, if a diameter of an open aperture of the diaphragm is made to be larger on the occasion of variation of magnifying power from an end of short focal length to an end of long focal length, a change of F number at an end of short focal length and at an end of long focal length can be made small, thus, it is possible to prevent an increase of F number at an end of long focal length without making F number at an end of short focal length to be small.

When the conditional expression (13) is satisfied, it is possible to control distortion at an end of short focal length, and changes in coma and curvature of the field both caused by variation of magnifying power, without lengthening the total lens length.

In the case of a zoom lens satisfying the conditional expression (13), a change of F number in the case of a constant diameter of a diaphragm is considerably great. Therefore, when a diameter of an open aperture is made to be greater on the occasion of variation of magnifying power from an end of short focal length to an end of long focal length as stated above, its effect is remarkable, and there can be obtained a zoom lens with high variation of magnifying power wherein aberration at an end of short focal length is corrected properly.

Further, in the Structure 18 above, a load of variation of magnifying power for the combination of the third lens group and the fourth lens group is further improved, if the conditional expression (14) is satisfied.

DETAILED DESCRIPTION OF THE PREFERRED EMBODIMENT

Examples of the zoom lens of the invention will be show below. Symbols in each example are as follows. In the following Examples, a glass lens is employed as the lens.

f: Focal length of the total system
$F_{no}$: F number
ω: Half angle of view
R: Radius of curvature of a refracting interface
D: Interval between refracting interfaces
N: Index of refraction for d line of lens material
V: Abbe number of lens material
$f_1$: Focal length of first lens group
$f_W$: Focal length of total system at an end of short focal length
$\beta_{3T}$: Paraxial lateral magnification of third lens group at an end of long focal length
$\beta_{3W}$: Paraxial lateral magnification of third lens group at an end of short focal length
$f_{3-a}$: Focal length of $(3\text{-}a)_{th}$ lens group
$f_{3-b}$: Focal length of $(3\text{-}b)^{th}$ lens group
$\beta_{34T}$: Paraxial lateral magnification of the combination of third lens group and fourth lens group at an end of long focal length
$\beta_{34W}$: Paraxial lateral magnification of the combination of third lens group and fourth lens group at an end of short focal length
$f_3$: Focal length of third lens group
$f_4$: Focal length of fourth lens group A form of an aspheric surface used in the invention is expressed by Expression 1 below when an x-axis in coordinates is taken in the direction of an optical axis and h represents a height in the direction perpendicular to the optical axis.

Expression 1

$$x = \frac{\frac{h^2}{R}}{1+\sqrt{1-(K+1)h^2/R^2}} + A_4 h^4 + A_6 h^6 + A_8 h^8 + A_{10} h^{10} + A_{12} h^{12}$$

In the Expression 1, K represents a cone constant of an aspheric surface, $A_{2i}$ represents an aspheric surface coefficient (i=2, 3, 4, 5 and 6) and R represents a paraxial radius of curvature.

In each example, an aperture-stop is arranged between the second lens group and the third lens group, and it may either be fixed or be moved in the course of variation of magnifying power.

EXAMPLE 1

Figure 1:
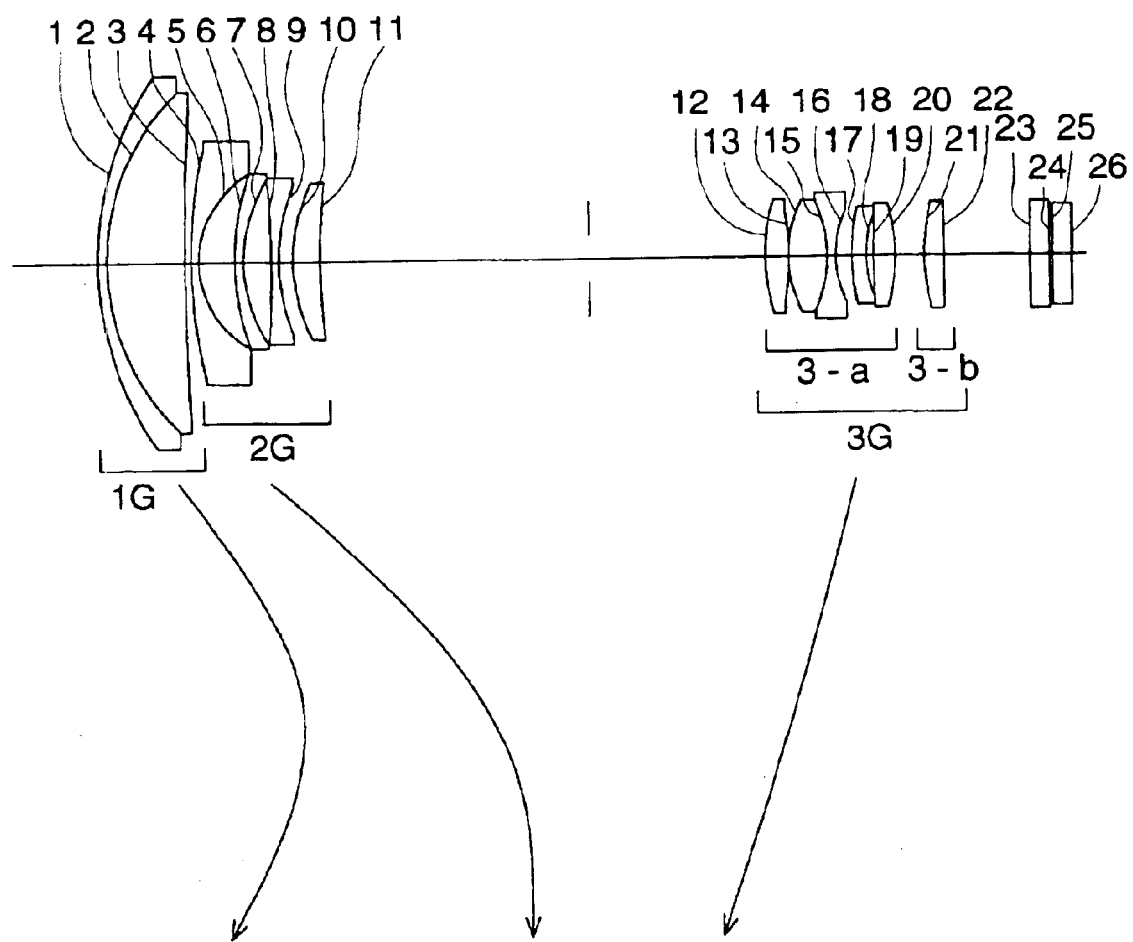
FIG. 1 represents a sectional view at an end of short focal length in Example 1 and a locus of movement of each lens group in variation of magnifying power.

Example 1 is an example included in Structure 1–Structure 4 and Structure 11–Structure 15. A sectional view at an end of short focal length and a locus of movement of each lens group in the course of variation of magnifying power are shown in FIG. 1, and lens data are shown in Table 1 and Table 2.

TABLE 1 f = 4.4–11.6–30.0, $F_{no}$ = 3.5–4.2–4.5, ω = 40°–17°–6.5°

| Surface No. | R | D | N | ν |
|---|---|---|---|---|
| 1 | 29.262 | 0.70 | 1.84666 | 23.8 |
| 2 | 20.919 | 7.00 | 1.69350 | 53.2 |
| 3 | 313.159 | 0.50–8.42–18.78 | | |
| 4 | 47.144 | 0.60 | 1.77250 | 49.6 |
| 5 | 8.763 | 3.20 | | |
| 6 | 26.248 | 0.60 | 1.77250 | 49.6 |
| 7 | 11.242 | 2.50 | | |
| 8 | −882.447 | 0.60 | 1.77250 | 49.6 |
| 9 | 16.621 | 1.30 | | |
| 10 | 15.264 | 2.50 | 1.84666 | 23.8 |
| 11 | 84.531 | 38.38–14.80–4.50 | | |
| 12 | 15.376 | 2.00 | 1.69350 | 53.2 |
| 13 | −73.947 | 0.20 | | |

TABLE 1-continued $f = 4.4–11.6–30.0$, $F_{no} = 3.5–4.2–4.5$, $\omega = 40°–17°–6.5°$

| Surface No. | R | D | N | ν |
|---|---|---|---|---|
| 14 | 11.626 | 3.30 | 1.69680 | 55.5 |
| 15 | −13.073 | 0.60 | 1.80610 | 40.9 |
| 16 | 12.159 | 1.50 | | |
| 17 | 27.815 | 1.00 | 1.84666 | 23.8 |
| 18 | 11.056 | 0.80 | | |
| 19 | 77.792 | 1.80 | 1.58913 | 61.2 |
| 20 | −15.872 | 2.50 | | |
| 21 | 22.825 | 1.80 | 1.48749 | 70.2 |
| 22 | −211.742 | 7.09–12.58–19.26 | | |
| 23 | ∞ | 1.75 | 1.54880 | 67.0 |
| 24 | ∞ | 0.20 | | |
| 25 | ∞ | 1.75 | 1.51633 | 64.1 |
| 26 | ∞ | | | |

TABLE 2

| Surface No. | Aspheric surface coefficient |
|---|---|
| 3rd surface | $K = 213.880$ |
| | $A_4 = 1.94530 \times 10^{-6}$ |
| | $A_6 = 1.66790 \times 10^{-8}$ |
| | $A_8 = 9.16040 \times 10^{-11}$ |
| | $A_{10} = -1.74830 \times 10^{-13}$ |
| 13th surface | $K = -4.9447$ |
| | $A_4 = 3.30060 \times 10^{-5}$ |
| | $A_6 = 1.50800 \times 10^{-7}$ |
| | $A_8 = -1.30090 \times 10^{-8}$ |
| | $A_{10} = 7.58940 \times 10^{-11}$ |
| | $f_1/f_w = 11.53$ |
| | $\beta_{3T}/\beta_{3W} = 3.61$ |
| | $f_{3-a}/f_{3-b} = 0.44$ |
| | $\omega_w = 40°$ |
| Open aperture diameter | End of short focal length = φ4.2 |
| | Medium = φ4.2 |
| | End of long focal length = φ6.0 |

Figure 2:
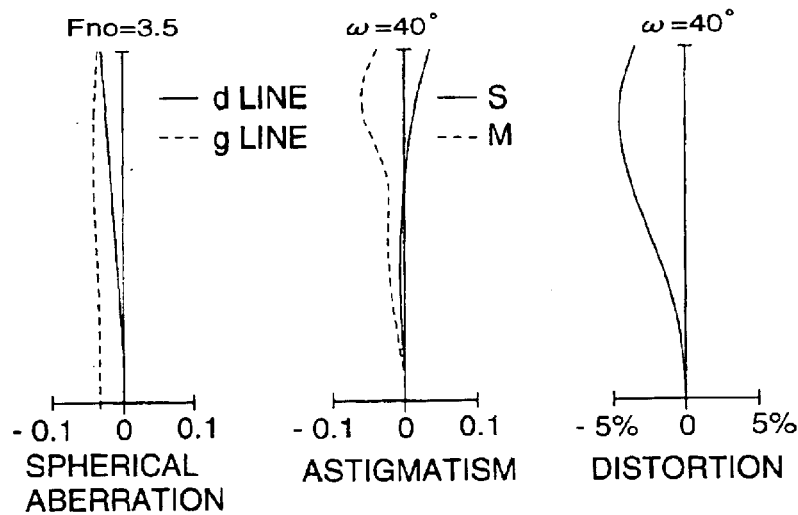
FIG. 2(A) is a diagram of aberrations at end of a short focal length.
FIG. 2(B) is a diagram of aberrations at a medium focal length and FIG. 2(C) is a diagram of aberrations at end of a long focal length in Example 1.
Figure 2:
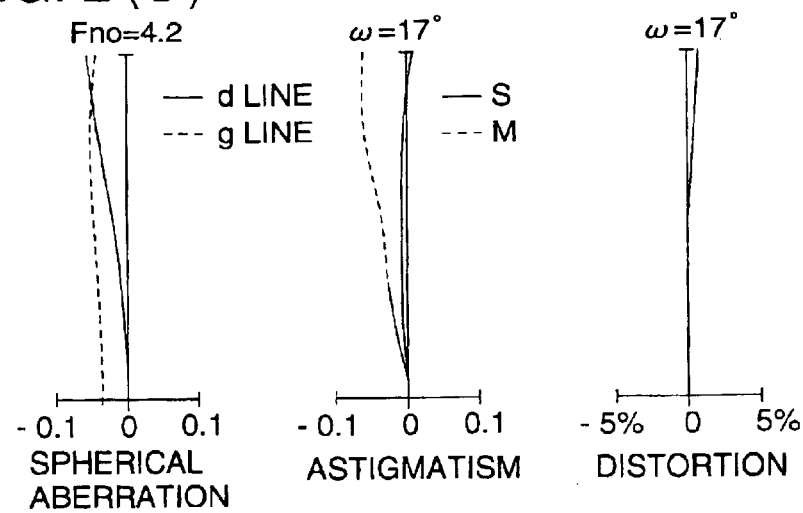
Figure 2:
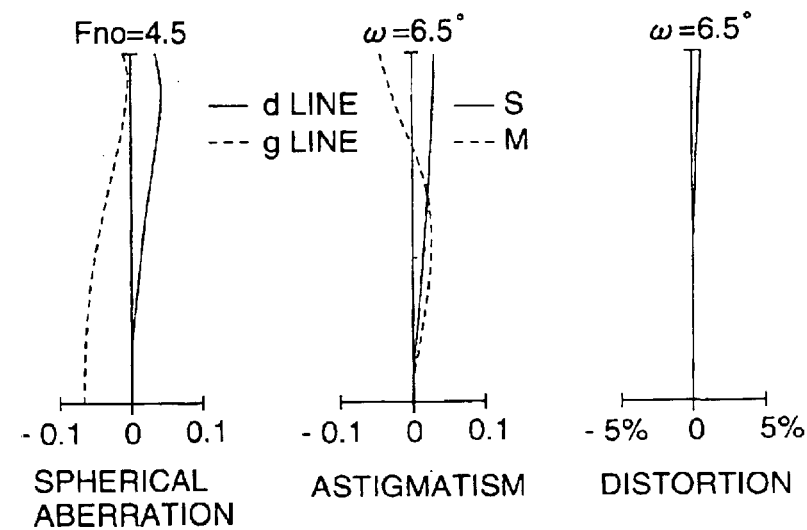

Lens aberrations are properly corrected as shown in FIG. 2.

EXAMPLE 2

Figure 3:
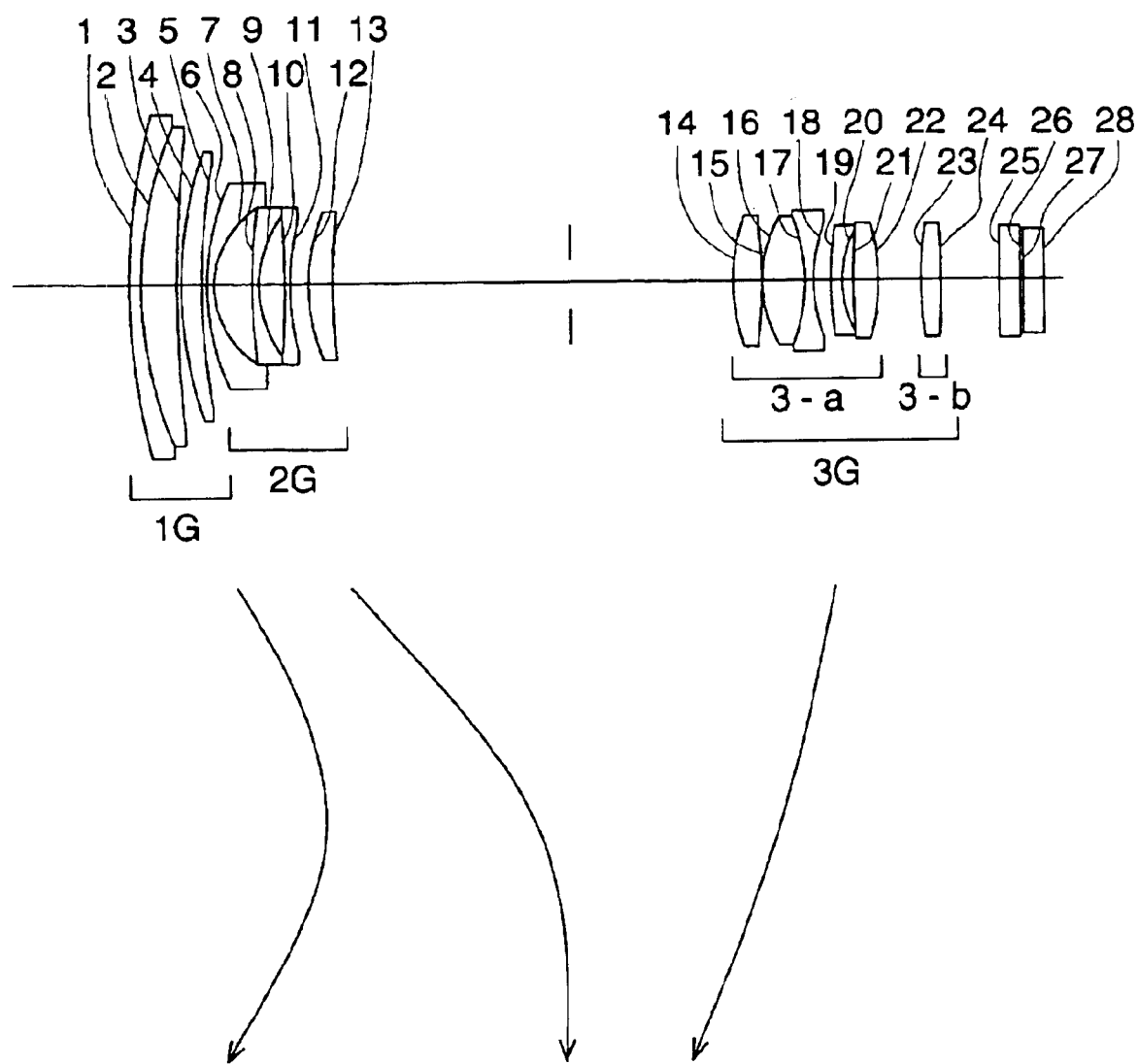
FIG. 3 represents a sectional view at an end of short focal length in Example 2 and a locus of movement of each lens group in variation of magnifying power.

Example 2 is an example included in Structure 1–Structure 4 and Structure 11–Structure 15. A sectional view at an end of short focal length and a locus of movement of each lens group in the course of variation of magnifying power in Example 2 are shown in FIG. 3, and lens data are shown in Table 3 and Table 4.

TABLE 3

$f = 4.4–9.8–22.0$, $F_{no} = 2.85–3.3–4.5$, $\omega = 40°–20°–9°$

| Surface No. | R | D | N | ν |
|---|---|---|---|---|
| 1 | 58.927 | 1.00 | 1.80518 | 25.4 |
| 2 | 37.067 | 3.00 | 1.69680 | 55.5 |
| 3 | 161.173 | 0.20 | | |
| 4 | 34.082 | 1.80 | 1.60311 | 60.7 |
| 5 | 63.182 | 0.50–8.59–19.44 | | |
| 6 | 21.883 | 0.60 | 1.77250 | 49.6 |
| 7 | 7.635 | 3.20 | | |
| 8 | 45.221 | 0.60 | 1.71300 | 53.9 |
| 9 | 11.099 | 2.00 | | |
| 10 | −87.468 | 0.60 | 1.71300 | 53.9 |
| 11 | 27.653 | 1.50 | | |
| 12 | 16.558 | 2.00 | 1.84666 | 23.8 |
| 13 | 72.202 | 33.49–13.35–3.50 | | |

TABLE 3-continued $f = 4.4–9.8–22.0$, $F_{no} = 2.85–3.3–4.5$, $\omega = 40°–20°–9°$

| Surface No. | R | D | N | ν |
|---|---|---|---|---|
| 14 | 15.448 | 2.50 | 1.69350 | 53.2 |
| 15 | −34.640 | 0.20 | | |
| 16 | 12.383 | 3.50 | 1.69680 | 55.5 |
| 17 | −13.565 | 0.60 | 1.83400 | 37.2 |
| 18 | 12.280 | 1.50 | | |
| 19 | 30.700 | 1.00 | 1.80518 | 25.4 |
| 20 | 11.175 | 1.00 | | |
| 21 | 64.039 | 2.00 | 1.48749 | 70.2 |
| 22 | −13.726 | 3.50 | | |
| 23 | 23.153 | 1.80 | 1.48749 | 70.2 |
| 24 | −67.425 | 4.85–9.82–17.24 | | |
| 25 | ∞ | 1.75 | 1.54880 | 67.0 |
| 26 | ∞ | 0.20 | | |
| 27 | ∞ | 1.75 | 1.51633 | 64.1 |
| 28 | ∞ | | | |

TABLE 4

| Surface No. | Aspheric surface coefficient |
|---|---|
| 15th surface | $K = -7.78440$ |
| | $A_4 = 3.28000 \times 10^{-5}$ |
| | $A_6 = 5.87960 \times 10^{-7}$ |
| | $A_8 = -3.23000 \times 10^{-8}$ |
| | $A_{10} = 3.94220 \times 10^{-10}$ |
| | $f_1/f_w = 15.43$ |
| | $\beta_{3T}/\beta_{3W} = 3.25$ |
| | $f_{3-a}/f_{3-b} = 0.47$ |
| | $\omega_w = 40°$ |
| Open aperture diameter | End of short focal length = φ5.1 |
| | Medium = φ5.1 |
| | End of long focal length = φ5.9 |

Figure 4:
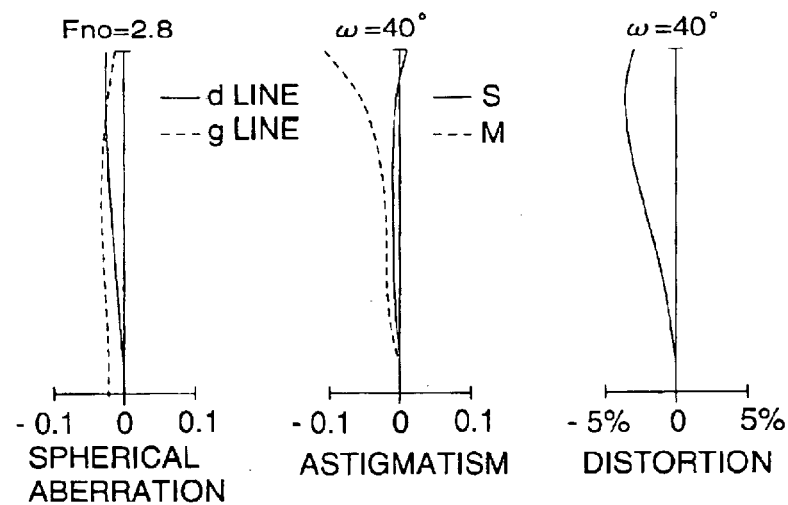
FIG. 4(A) is a diagram of aberrations at end of a short focal length.
FIG. 4(B) is a diagram of aberrations at a medium focal length and FIG. 4(C) is a diagram of aberrations at end of a long focal length in Example 2.
Figure 4:
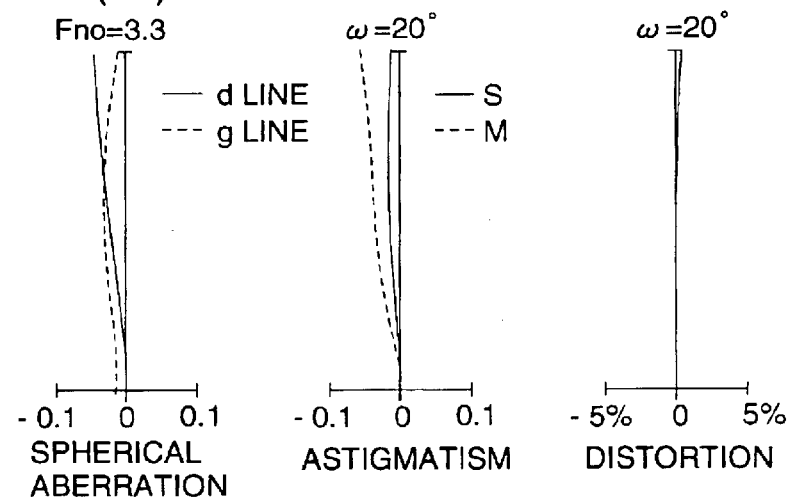
Figure 4:
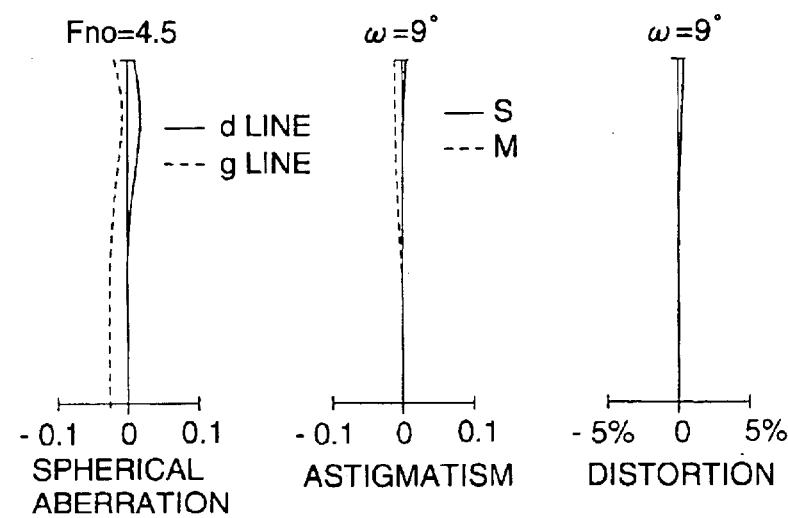

Lens aberrations are properly corrected as shown in FIG. 4.

EXAMPLE 3

Figure 5:
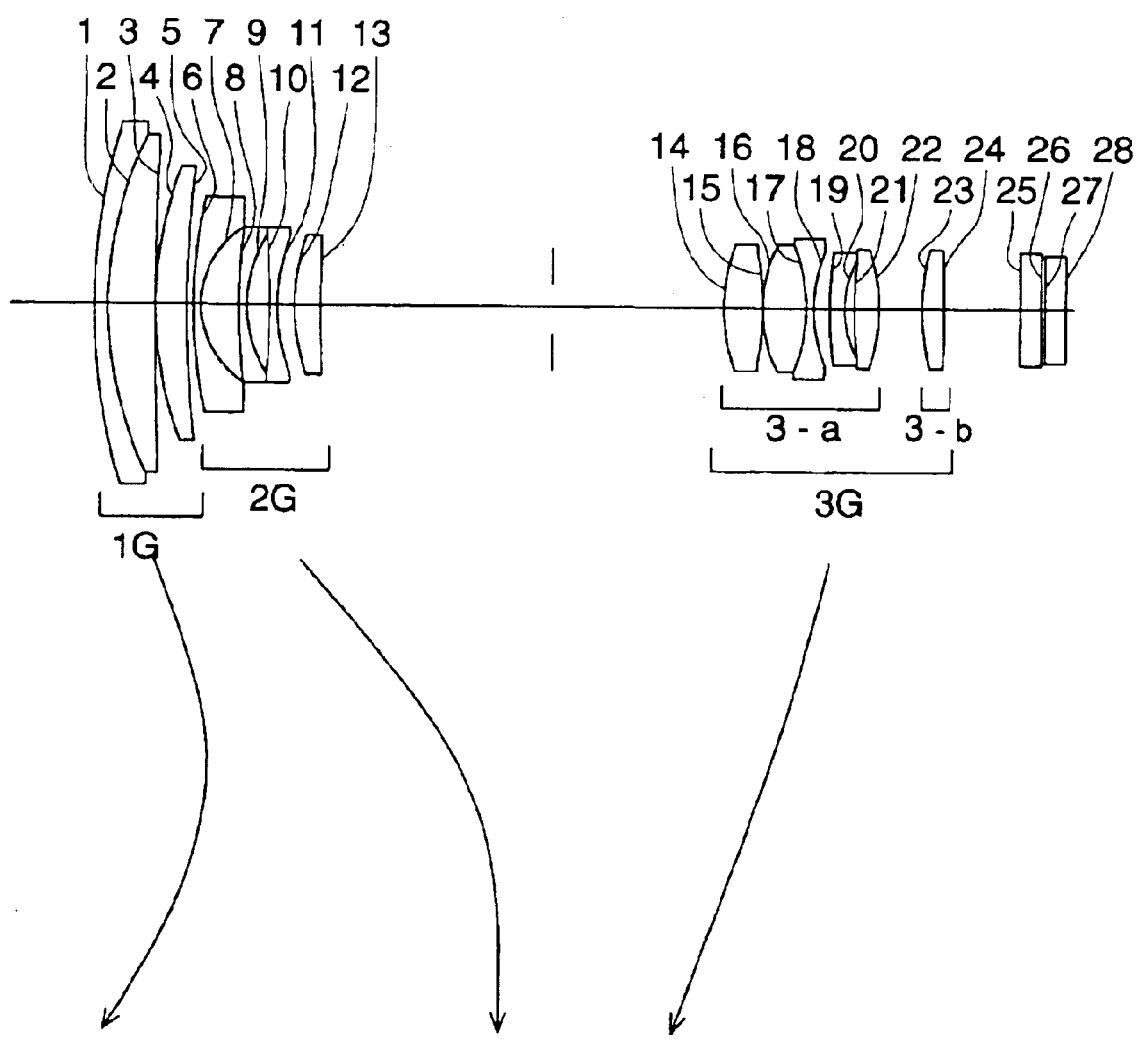
FIG. 5 represents a sectional view at an end of short focal length in Example 3 and a locus of movement of each lens group in variation of magnifying power.

Example 3 is an example included in Structure 1–Structure 4 and Structure 11–Structure 15. A sectional view at an end of short focal length and a locus of movement of each lens group in the course of variation of magnifying power in Example 3 are shown in FIG. 5, and lens data are shown in Table 5 and Table 6.

TABLE 5

$f = 4.4–11.5–30.0$, $F_{no} = 3.5–4.2–4.5$, $\omega = 40°–17°–6.5°$

| Surface No. | R | D | N | ν |
|---|---|---|---|---|
| 1 | 54.559 | 1.00 | 1.80518 | 25.4 |
| 2 | 31.612 | 3.80 | 1.69680 | 55.5 |
| 3 | 218.389 | 0.20 | | |
| 4 | 32.697 | 2.50 | 1.60311 | 60.7 |
| 5 | 80.198 | 0.50–10.72–21.41 | | |
| 6 | 42.769 | 0.60 | 1.72916 | 54.7 |
| 7 | 7.997 | 3.20 | | |
| 8 | 39.612 | 0.60 | 1.69680 | 55.5 |
| 9 | 11.087 | 2.00 | | |
| 10 | −144.820 | 0.60 | 1.69680 | 55.5 |
| 11 | 17.423 | 1.50 | | |
| 12 | 15.586 | 2.20 | 1.80518 | 25.4 |
| 13 | 94.751 | 33.48–13.17–3.50 | | |
| 14 | 15.986 | 3.00 | 1.69350 | 53.2 |
| 15 | −57.121 | 0.20 | | |
| 16 | 12.100 | 3.60 | 1.69680 | 55.5 |

TABLE 5-continued $f = 4.4–11.5–30.0$, $F_{no} = 3.5–4.2–4.5$, $\omega = 40°–17°–6.5°$

| Surface No. | R | D | N | ν |
|---|---|---|---|---|
| 17 | −15.584 | 0.60 | 1.83400 | 37.2 |
| 18 | 12.324 | 1.50 | | |
| 19 | 26.266 | 1.00 | 1.80518 | 25.4 |
| 20 | 11.350 | 1.00 | | |
| 21 | 50.812 | 2.00 | 1.48749 | 70.2 |
| 22 | −15.132 | 3.50 | | |
| 23 | 19.412 | 1.80 | 1.48749 | 70.2 |
| 24 | −108.863 | 6.38–12.13–19.57 | | |
| 25 | ∞ | 1.75 | 1.54880 | 67.0 |
| 26 | ∞ | 0.20 | | |
| 27 | ∞ | 1.75 | 1.51633 | 64.1 |
| 28 | ∞ | | | |

TABLE 6

| Surface No. | Aspheric surface coefficient |
|---|---|
| 15$^{th}$ surface | K = −10.1290<br>$A_4 = 3.00180 \times 10^{-5}$<br>$A_6 = +5.72400 \times 10^{-7}$<br>$A_9 = -2.06950 \times 10^{-8}$<br>$A_{10} = 1.59490 \times 10^{-10}$<br>$f_1/f_w = 11.89$<br>$\beta_{3T}/\beta_{3w} = 3.10$<br>$f_{3-a}/f_{3-b} = 0.53$<br>$\omega_w = 40°$ |
| Open aperture diameter | End of short focal length = φ4.2<br>Medium = φ4.2<br>End of long focal length = φ6.1 |

Figure 6:
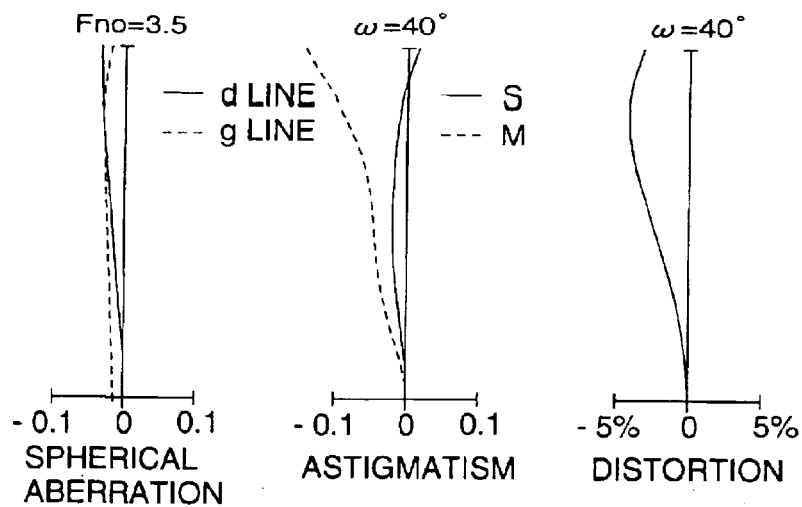
FIG. 6(A) is a diagram of aberrations at end of a short focal length.
FIG. 6(B) is a diagram of aberrations at a medium focal length and FIG. 6(C) is a diagram of aberrations at end of a long focal length in Example 3.
Figure 6:
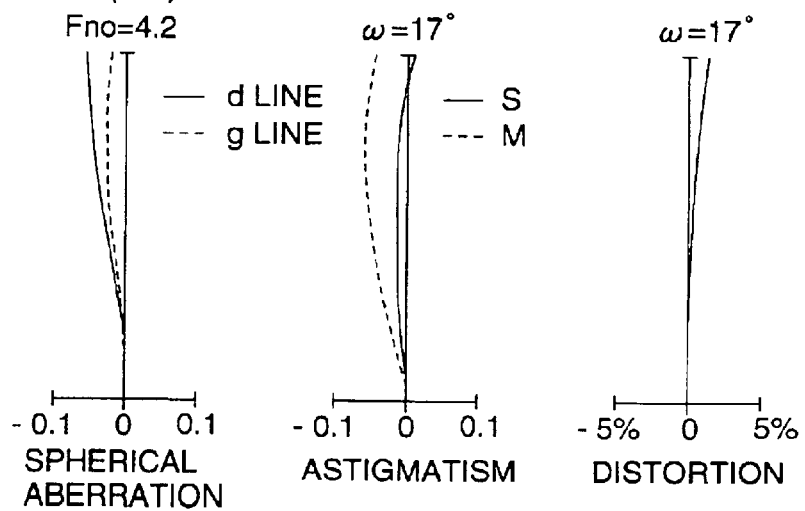
Figure 6:
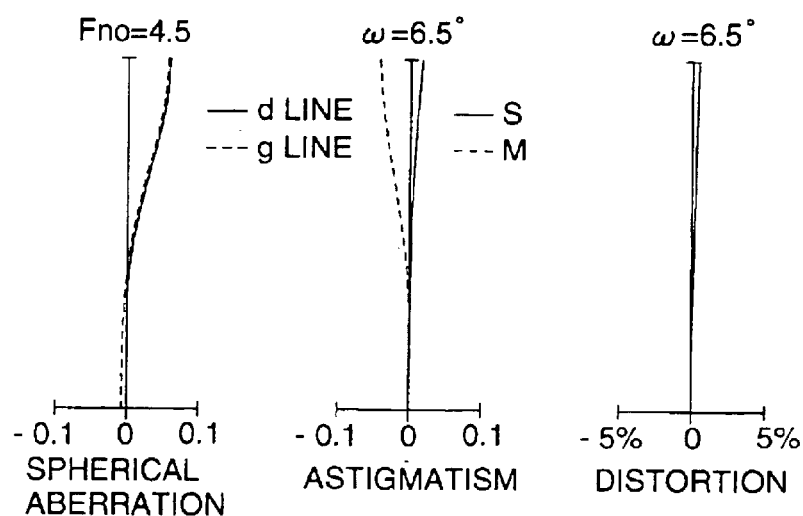

Lens aberrations are properly corrected as shown in FIG. 6.

EXAMPLE 4

Figure 7:
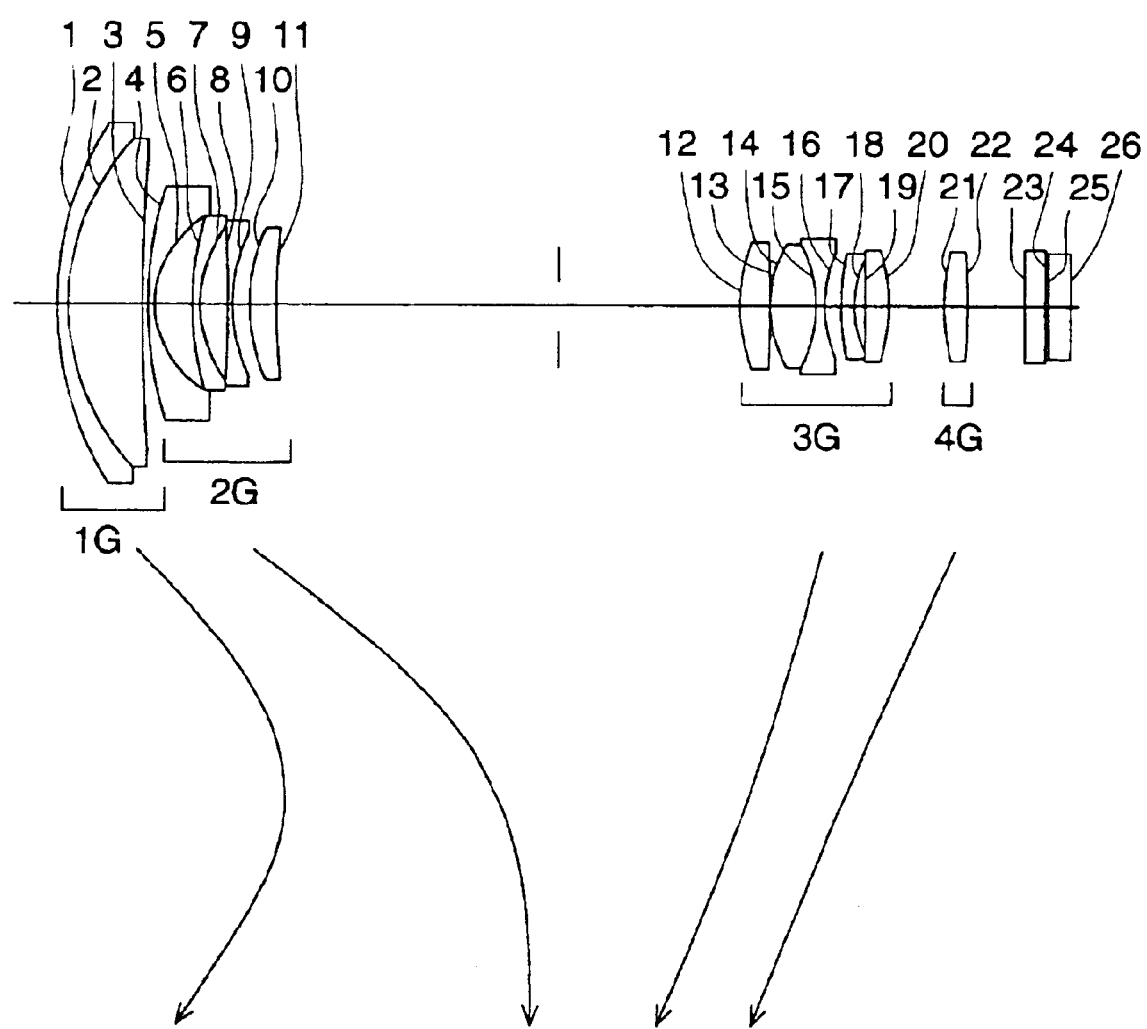
FIG. 7 represents a sectional view at an end of short focal length in Example 4 and a locus of movement of each lens group in variation of magnifying power.

Example 4 is an example included in Structure 5 –Structure 12 and Structure 16–Structure 18. A sectional view at an end of short focal length and a locus of movement of each lens group in the course of variation of magnifying power in Example 4 are shown in FIG. 7, and lens data are shown in Table 7 and Table 8.

TABLE 7

$f = 4.4–11.5–30.0$, $F_{no} = 3.5–4.1–4.5$, $\omega = 40°–17°–6.5°$

| Surface No. | R | D | N | ν |
|---|---|---|---|---|
| 1 | 29.804 | 1.00 | 1.84666 | 23.8 |
| 2 | 21.084 | 6.00 | 1.69350 | 53.2 |
| 3 | 236.755 | 0.50–7.04–18.76 | | |
| 4 | 38.483 | 0.60 | 1.77250 | 49.6 |
| 5 | 8.173 | 3.10 | | |
| 6 | 30.375 | 0.60 | 1.77250 | 49.6 |
| 7 | 11.479 | 2.20 | | |
| 8 | −3015.661 | 0.60 | 1.77250 | 49.6 |
| 9 | 17.148 | 1.30 | | |
| 10 | 15.376 | 2.30 | 1.84666 | 23.8 |
| 11 | 90.502 | 38.38–12.75–3.50 | | |
| 12 | 15.559 | 2.50 | 1.69350 | 53.2 |
| 13 | −74.931 | 0.20 | | |
| 14 | 11.660 | 3.80 | 1.69680 | 55.5 |
| 15 | −10.977 | 0.60 | 1.80610 | 40.9 |
| 16 | 12.234 | 1.50 | | |
| 17 | 28.251 | 1.00 | 1.84666 | 23.8 |
| 18 | 11.055 | 1.00 | | |
| 19 | 70.620 | 1.80 | 1.58913 | 61.2 |

TABLE 7-continued $f = 4.4–11.5–30.0$, $F_{no} = 3.5–4.1–4.5$, $\omega = 40°–17°–6.5°$

| Surface No. | R | D | N | ν |
|---|---|---|---|---|
| 20 | −15.712 | 4.65–2.26–2.00 | | |
| 21 | 21.937 | 1.80 | 1.48749 | 70.2 |
| 22 | −165.321 | 5.16–13.44–21.61 | | |
| 23 | ∞ | 1.75 | 1.54880 | 67.0 |
| 24 | ∞ | 0.20 | | |
| 25 | ∞ | 1.75 | 1.51633 | 64.1 |
| 26 | ∞ | | | |

TABLE 8

| Surface No. | Aspheric surface coefficient |
|---|---|
| 3$^{rd}$ surface | K = 248.930<br>$A_4 = -8.97320 \times 10^{-7}$<br>$A_6 = -1.25140 \times 10^{-8}$<br>$A_8 = 4.89210 \times 10^{-11}$<br>$A_{10} = -2.93520 \times 10^{-13}$ |
| 13$^{th}$ surface | K = 11.4980<br>$A_4 = 2.77260 \times 10^{-5}$<br>$A_6 = 4.97220 \times 10^{-7}$<br>$A_8 = -2.42860 \times 10^{-8}$<br>$A_{10} = 1.36880 \times 10^{-10}$<br>$f_1/f_w = 12.22$<br>$\beta_{34T}/\beta_{34w} = 3.61$<br>$f_3/f_4 = 0.44$<br>$\omega_w = 40°$ |
| Open aperture diameter | End of short focal length = φ4.3<br>Medium = φ4.3<br>End of long focal length = φ6.5 |

Figure 8:
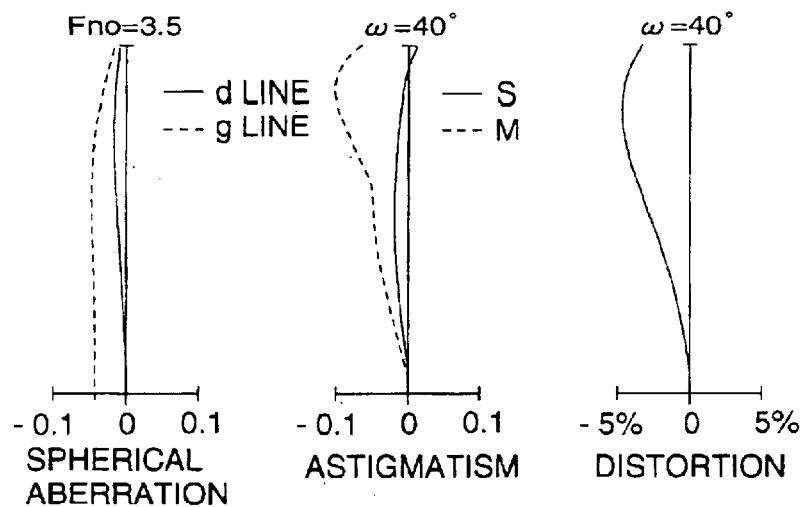
FIG. 8(A) is a diagram of aberrations at end of a short focal length.
FIG. 8(B) is a diagram of aberrations at a medium focal length and FIG. 8(C) is a diagram of aberrations at end of a long focal length in Example 4.
Figure 8:
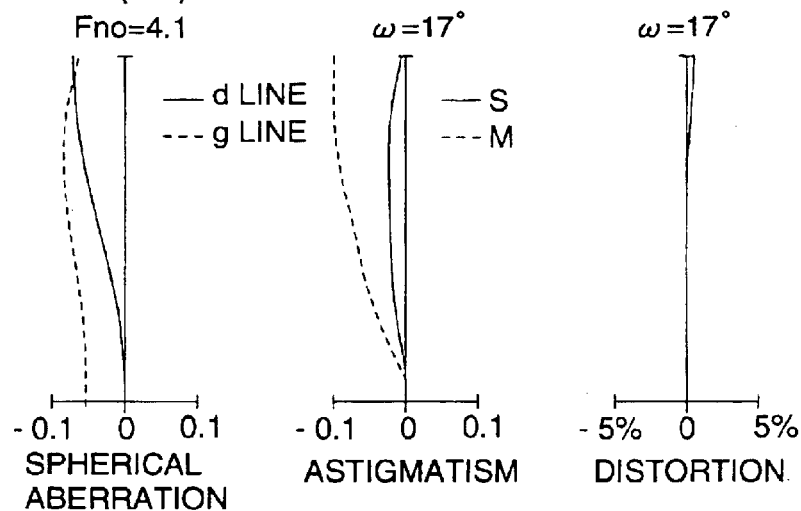
Figure 8:
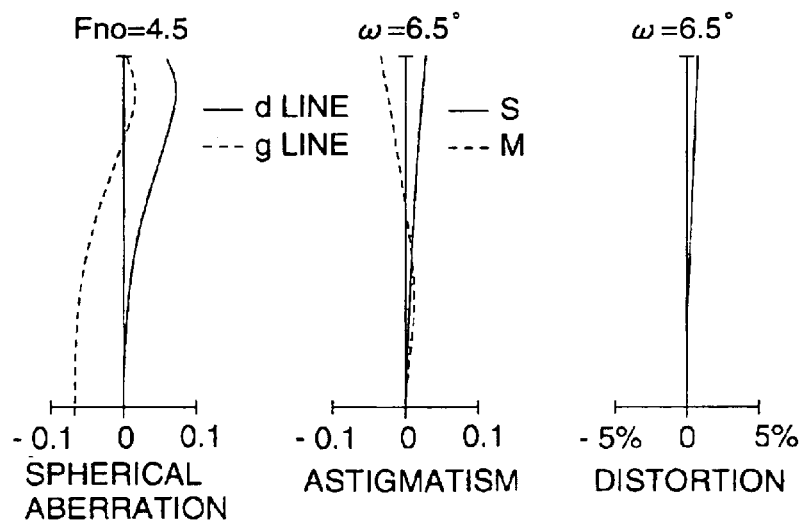

Lens aberrations are properly corrected as shown in FIG. 8.

EXAMPLE 5

Figure 9:
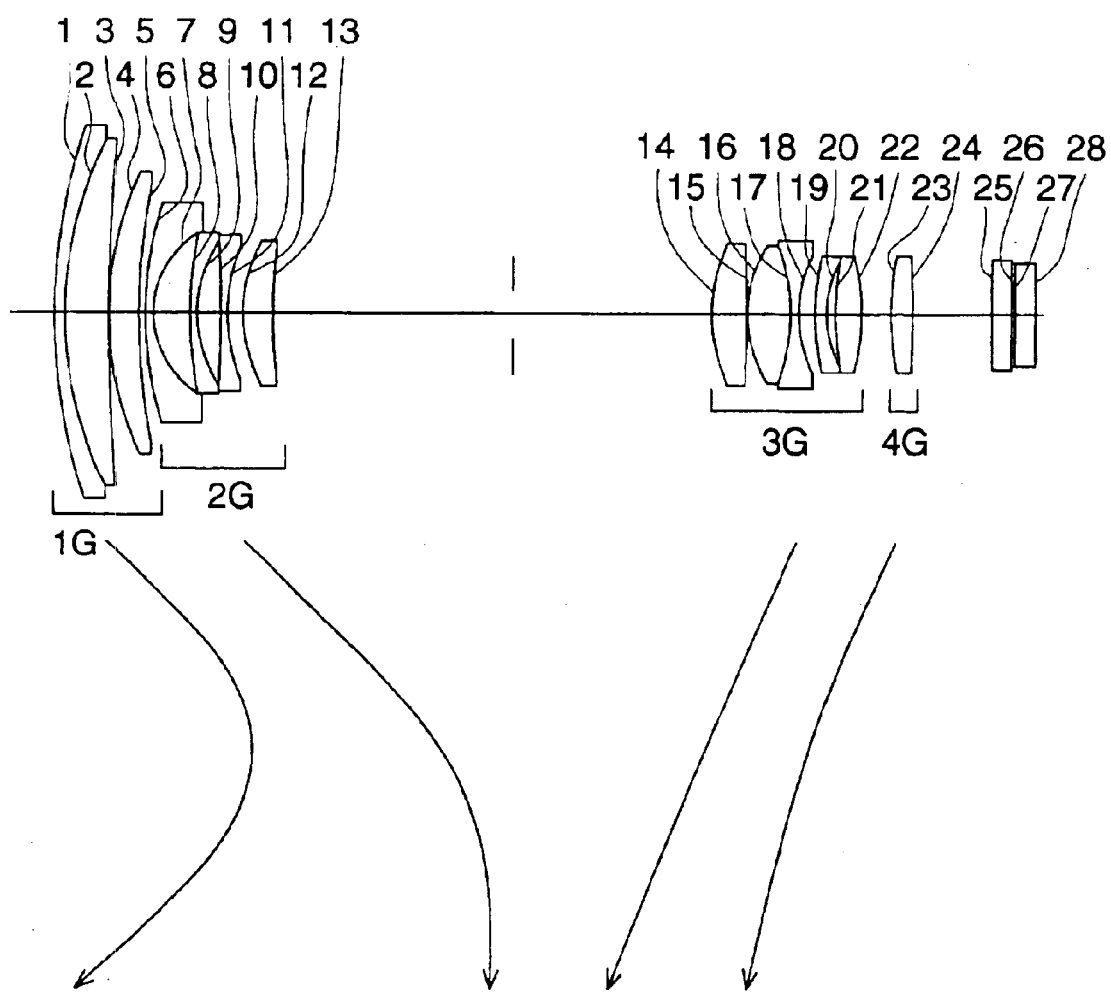
FIG. 9 represents a sectional view at an end of short focal length in Example 5 and a locus of movement of each lens group in variation of magnifying power.

Example 5 is an example included in Structure 5–Structure 12 and Structure 16–Structure 18. A sectional view at an end of short focal length and a locus of movement of each lens group in the course of variation of magnifying power in Example 5 are shown in FIG. 9, and lens data are shown in Table 9 and Table 10.

TABLE 9

$f = 4.4–11.5–30.0$, $F_{no} = 3.5–4.5–4.5$, $\omega = 40°–17°–6.5°$

| Surface No. | R | D | N | ν |
|---|---|---|---|---|
| 1 | 54.955 | 1.00 | 1.84666 | 23.8 |
| 2 | 35.693 | 3.80 | 1.63854 | 55.4 |
| 3 | 215.410 | 0.20 | | |
| 4 | 33.125 | 2.50 | 1.60311 | 60.7 |
| 5 | 79.470 | 0.50–4.42–21.02 | | |
| 6 | 35.437 | 0.60 | 1.77250 | 49.6 |
| 7 | 8.468 | 3.20 | | |
| 8 | 33.849 | 0.60 | 1.72916 | 54.7 |
| 9 | 11.621 | 1.90 | | |
| 10 | −699.561 | 0.60 | 1.72916 | 54.7 |
| 11 | 18.081 | 1.50 | | |
| 12 | 15.549 | 2.50 | 1.80518 | 25.4 |
| 13 | 86.274 | 37.39–11.07–3.00 | | |
| 14 | 16.025 | 3.00 | 1.69350 | 53.2 |
| 15 | −66.188 | 0.20 | | |
| 16 | 12.059 | 3.60 | 1.69680 | 55.5 |
| 17 | −16.791 | 0.60 | 1.83400 | 37.2 |
| 18 | 12.287 | 1.50 | | |
| 19 | 26.529 | 1.00 | 1.80518 | 25.4 |

TABLE 9-continued $f = 4.4–11.5–30.0$, $F_{no} = 3.5–4.5–4.5$, $\omega = 40°–17°–6.5°$

| Surface No. | R | D | N | ν |
|---|---|---|---|---|
| 20 | 11.350 | 1.00 | | |
| 21 | 56.965 | 2.00 | 1.48749 | 70.2 |
| 22 | −15.330 | 2.36–3.29–4.13 | | |
| 23 | 19.824 | 1.80 | 1.48749 | 70.2 |
| 24 | −107.501 | 7.04–14.39–20.96 | | |
| 25 | ∞ | 1.75 | 1.54880 | 67.0 |
| 26 | ∞ | 0.20 | | |
| 27 | ∞ | 1.75 | 1.51633 | 64.1 |
| 28 | ∞ | | | |

TABLE 10

| Surface No. | Aspheric surface coefficient |
|---|---|
| 15$^{th}$ surface | $K = -14.1620$ |
| | $A_4 = 2.95740 \times 10^{-5}$ |
| | $A_6 = 3.56890 \times 10^{-7}$ |
| | $A_8 = -1.22930 \times 10^{-8}$ |
| | $A_{10} = 7.85020 \times 10^{-11}$ |
| | $f_1/f_w = 13.12$ |
| | $\beta_{34T}/\beta_{34w} = 3.57$ |
| | $f_3/f_4 = 0.54$ |
| | $\omega_w = 40°$ |
| Open aperture diameter | End of short focal length = φ4.0 |
| | Medium = φ4.1 |
| | End of long focal length = φ6.5 |

Figure 10:
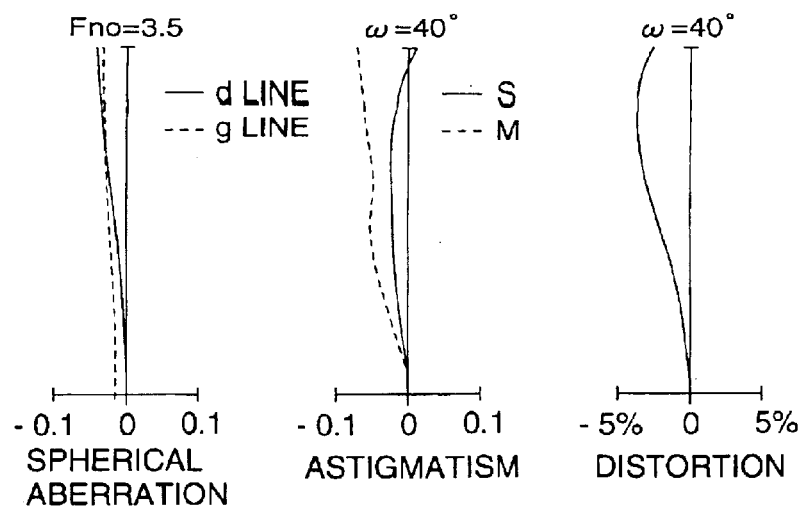
FIG. 10(A) is a diagram of aberrations at end of a short focal length.
FIG. 10(B) is a diagram of aberrations at a medium focal length and FIG. 10(C) is a diagram of aberrations at end of a long focal length in Example 5.
Figure 10:
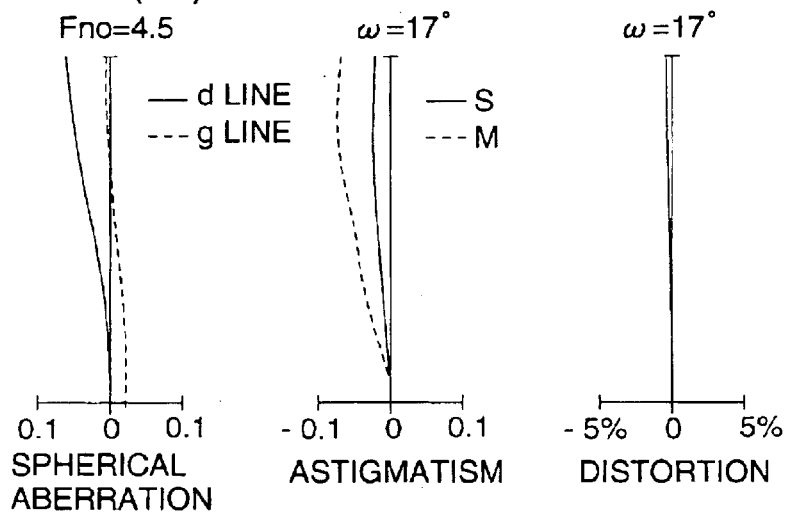
Figure 10:
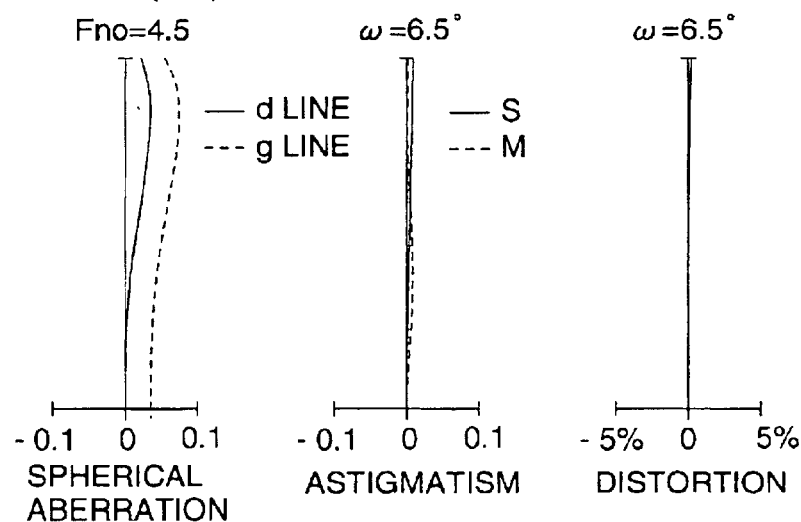

Lens aberrations are properly corrected as shown in FIG. 10.

EXAMPLE 6

Figure 11:
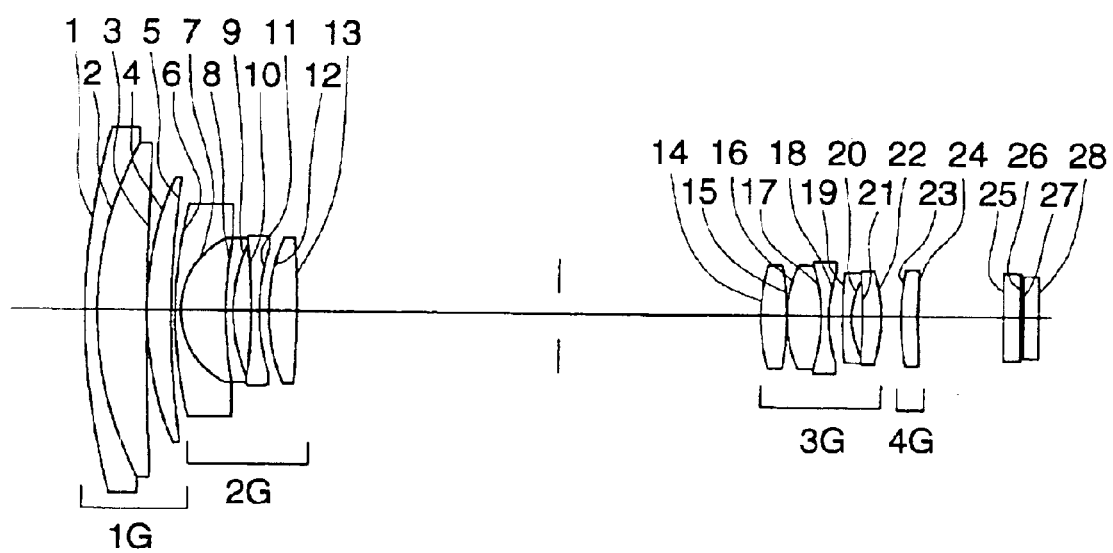
FIG. 11 represents a sectional view at an end of short focal length in Example 6 and a locus of movement of each lens group in variation of magnifying power.

Example 6 is an example included in Structure 5–Structure 12 and Structure 16–Structure 18. A sectional view at an end of short focal length and a locus of movement of each lens group in the course of variation of magnifying power in Example 6 are shown in FIG. 11, and lens data are shown in Table 11 and Table 12.

TABLE 11

$f = 4.4–14.4–47.0$, $F_{no} = 3.5–4.5–5.0$, $\omega = 40°–14°–4.3°$

| Surface No. | R | D | N | ν |
|---|---|---|---|---|
| 1 | 67.399 | 1.20 | 1.80518 | 25.4 |
| 2 | 36.304 | 5.20 | 1.72916 | 54.7 |
| 3 | 318.790 | 0.20 | | |
| 4 | 35.552 | 2.60 | 1.60311 | 60.7 |
| 5 | 95.428 | 0.50–9.81–22.14 | | |
| 6 | 50.592 | 0.60 | 1.80400 | 46.6 |
| 7 | 8.620 | 4.50 | | |
| 8 | 52.695 | 0.60 | 1.77250 | 49.6 |
| 9 | 18.312 | 2.00 | | |
| 10 | −68.365 | 0.60 | 1.77250 | 49.6 |
| 11 | 22.129 | 1.00 | | |
| 12 | 18.378 | 2.70 | 1.84666 | 23.8 |
| 13 | −2627.046 | 48.35–15.93–3.50 | | |
| 14 | 17.651 | 2.50 | 1.69359 | 53.2 |
| 15 | −56.058 | 0.20 | | |
| 16 | 12.230 | 3.60 | 1.69680 | 55.5 |
| 17 | −20.162 | 0.60 | 1.83400 | 37.2 |
| 18 | 12.396 | 1.50 | | |
| 19 | 25.636 | 1.00 | 1.80518 | 25.4 |
| 20 | 11.575 | 1.00 | | |
| 21 | 87.104 | 2.00 | 1.48749 | 70.2 |
| 22 | −17.535 | 2.00–3.10–3.87 | 1.48749 | 70.2 |

TABLE 11-continued $f = 4.4–14.4–47.0$, $F_{no} = 3.5–4.5–5.0$, $\omega = 40°–14°–4.3°$

| Surface No. | R | D | N | ν |
|---|---|---|---|---|
| 23 | 24.386 | 1.80 | | |
| 24 | 180.879 | 8.89–17.20–31.19 | | |
| 25 | ∞ | 1.75 | 1.54880 | 67.0 |
| 26 | ∞ | 0.20 | | |
| 27 | ∞ | 1.75 | 1.51633 | 64.1 |
| 28 | ∞ | | | |

TABLE 12

| Surface No. | Aspheric surface coefficient |
|---|---|
| 15$^{th}$ surface | $K = 6.36130 \times 10^{-2}$ |
| | $A_4 = 2.50650 \times 10^{-5}$ |
| | $A_6 = -4.90120 \times 10^{-8}$ |
| | $A_8 = 1.03370 \times 10^{-8}$ |
| | $A_{10} = -2.90100 \times 10^{-10}$ |
| | $f_1/f_4 = 12.53$ |
| | $\beta_{34T}/\beta_{34w} = 4.94$ |
| | $f_3/f_4 = 0.35$ |
| | $\omega_w = 40°$ |
| Open aperture diameter | End of short focal length = φ5.2 |
| | Medium = φ5.4 |
| | End of long focal length = φ8.6 |

Figure 12:
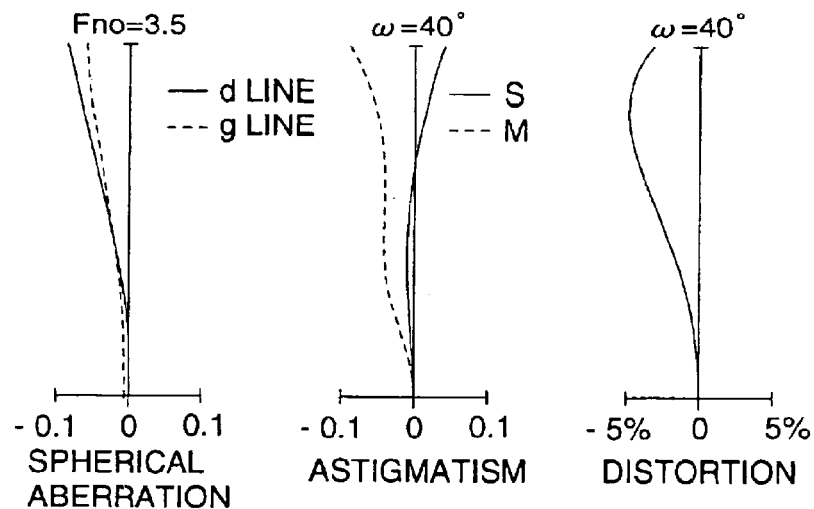
FIG. 12(A) is a diagram of aberrations at end of a short focal length.
FIG. 12(B) is a diagram of aberrations at a medium focal length and FIG. 12(C) is a diagram of aberrations at end of a long focal length in Example 6.
Figure 12:
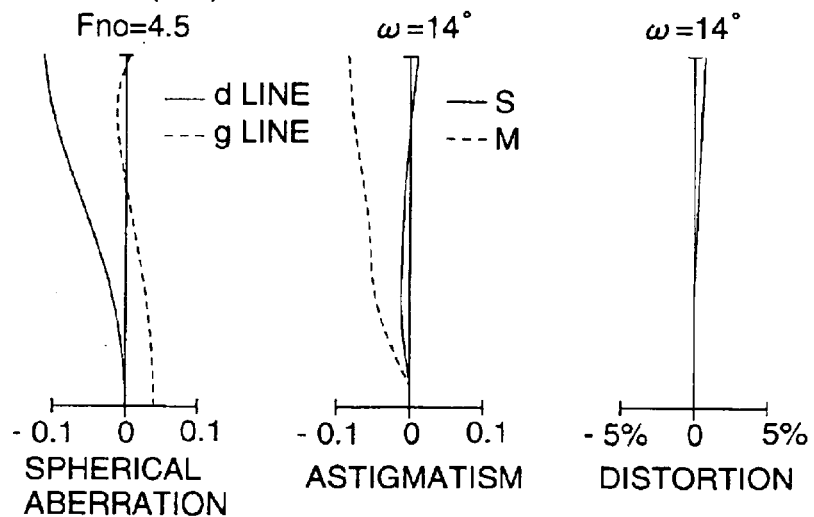
Figure 12:
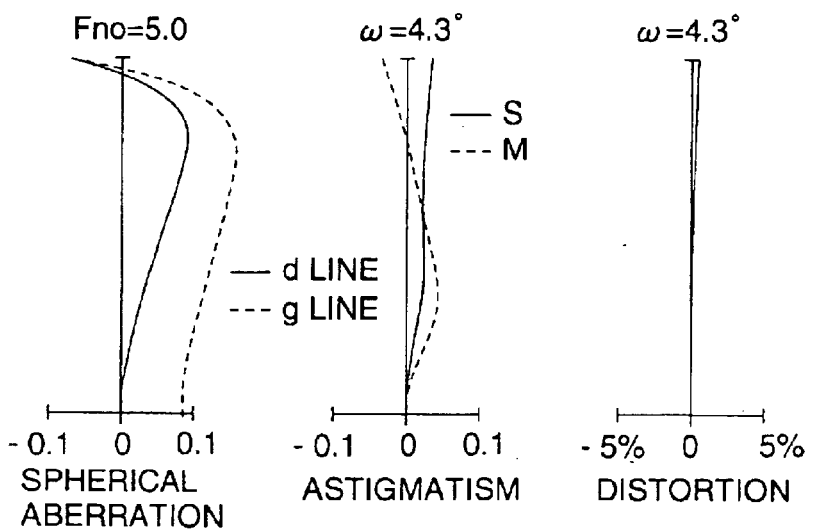

Lens aberrations are properly corrected as shown in FIG. 12.

Since the structure is arranged as stated above, the following effect can be exhibited. Namely, the invention makes it possible to obtain a zoom lens wherein various aberrations are excellently corrected so that the zoom lens may be used properly in a high pixel digital camera, although the zoom lens has a ratio of variable power which is as high as 5 times–11 times, and a half angle of view is 40° representing a wide angle. In other words, it is possible to obtain a zoom lens having sufficient image forming capacity. It is further possible to obtain a zoom lens having image forming capacity which is of high magnifying power and of wide angle and yet is applicable to a digital still camera employing a solid image pick-up element such as CCD having pixels in quantity of a million or more. Though various aberrations can be corrected properly, distortion at an end of short focal length and magnification chromatic aberration can be corrected properly, in particular. Disclosed embodiment can be varied by a skilled person without departing from the spirit and scope of the invention.

What is claimed is:

1. A zoom lens to form an image of an object with variable magnification between a shortest focal length and a longest focal length, comprising:

a first lens group having a positive refracting power;

a second lens group positioned closer to the image than the first lens group and having a negative refracting power; and a third lens group positioned closer to the image than the second lens group and having a positive refracting power;

wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased, wherein the third lens group comprises at least a single positive lens and at least a single negative lens, wherein a variable magnification ratio of the zoom lens is four times or more, and wherein the zoom lens satisfies the following formula:

$$2.9 < \beta_{3T}/\beta_{3W} < 8$$

wherein $\beta_{3T}$ is a paraxial lateral magnification of the third lens group on the condition that the zoom lens is structured to effect the longest length, and $\beta_{3W}$ is a paraxial lateral magnification of the third lens group on the condition that the zoom lens is structured to effect the shortest focal length.

2. The zoom lens of claim 1, wherein the variable magnification ratio of the zoom lens is five times or more.

3. The zoom lens of claim 1, wherein the first lens group comprises at least a single positive lens and at least a single negative lens.

4. The zoom lens of claim 1, wherein the zoom lens satisfies the following formula:

$$4.5 < f_1/f_W < 20$$

where $f_1$ is a focal length of the first lens group, and $f_W$ is the shortest focal length of the zoom lens.

5. The zoom lens of claim 1, wherein the zoom lens satisfies the following formula:

$$32° < \omega_W < 50°$$

where $\omega_W$ is a half angle of view on the condition that the zoom lens is structured to effect the shortest focal length.

6. The zoom lens of claim 5, wherein the second lens group comprises three negative lenses and a positive lens arranged in this order from the object.

7. The zoom lens of claim 6, wherein the zoom lens satisfies the following formula:

$$1.5 < f_1/f_W < 20$$

where $f_1$ is a focal length of the first lens group, and $f_W$ is the shortest focal length of the zoom lens.

8. The zoom lens of claim 1, further comprising:

an aperture stop, wherein when the magnification is changed from the shortest focal length to the longest focal length, an aperture diameter of the aperture stop becomes larger.

9. The zoom lens of claim 8, wherein the aperture stop is provided between the second lens group and the third lens group.

10. The zoom lens of claim 1, wherein when the magnification is changed from the shortest focal length to the longest focal length, the first lens group is shifted toward the object once after shifted toward the image.

11. A video camera, comprising:

an image pick-up element, and a zoom lens comprising, a first lens group having a positive refracting power;

a second lens group positioned closer to the image than the first lens group and having a negative refracting power; and a third lens group positioned closer to the image than the second lens group and having a positive refracting power;

wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased, wherein the third lens group comprises at least a single positive lens and at least a single negative lens, wherein a magnification ratio of the zoom lens is four times or more, and wherein the zoom lens satisfies the following formula:

$$2.9 < \beta_{3T}/\beta_{3W} < 8$$

wherein $\beta_{3T}$ is a paraxial lateral magnification of the third lens group on the condition that the zoom lens is structured to effect the longest length, and $\beta_{3W}$ is a paraxial lateral magnification of the third lens group on the condition that the zoom lens is structured to effect the shortest focal length.

12. A digital still camera, comprising:

an image pick-up element, and a zoom lens comprising, a first lens group having a positive refracting power, a second lens group positioned closer to the image than the first lens group and having a negative refracting power; and a third lens group positioned closer to the image than the second lens group and having a positive refracting power;

wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased, wherein the third lens group comprises at least a single positive lens and at least a single negative lens, wherein a magnification ratio of the zoom lens is four times or more, and wherein the zoom lens satisfies the following formula:

$$2.9 < \beta_{3T}/\beta_{3W} < 8$$

wherein $\beta_{3T}$ is a paraxial lateral magnification of the third lens group on the condition that the zoom lens is structured to effect the longest focal length, and $\beta_{3W}$ is a paraxial lateral magnification of the third lens group on the condition that the zoom lens is structured to effect the shortest focal length.

13. A zoom lens to form an image of an object with variable magnification between a shortest focal length and a longest focal length, comprising:

a first lens group having a positive refracting power;

a second lens group positioned closer to the image than the first lens group and having a negative refracting power;

a third lens group positioned closer to the image than the second lens group and having a positive refracting power; and a fourth lens group positioned closer to the image than the third lens group and having a positive refracting power, wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased, wherein the third lens group comprises at least a single positive lens and at least a single negative lens, wherein a variable magnification ratio of the zoom lens is four times or more, and wherein the zoom lens satisfies the following formula:

$$3.3 < \beta_{34T}/\beta_{34W} < 8$$

where $\beta_{34T}$ is a paraxial lateral magnification of the combination of the third lens group and the fourth lens group on the condition that the zoom lens is structured to effect the longest focal length, and $\beta_{34W}$ is a synthesized paraxial lateral magnification of the combination of the third lens group and the fourth lens group on the condition that the zoom lens is structure to effect the shortest focal length.

14. The zoom lens of claim 13, wherein when the magnification is changed from the shortest focal length to the longest focal length, the fourth lens group is shifted toward the object.

15. The zoom lens of claim 13, wherein the zoom lens satisfies the following formula:

$$0.25 < f_3/f_4 < 0.7$$

where $f_3$ is a focal length of the third lens group, and $f_4$ is a focal length of the fourth lens group.

16. The zoom lens of claim 13, wherein the first lens group comprises at least a single positive lens and at least a single negative lens.

17. The zoom lens of claim 13, wherein the zoom lens satisfies the following formula:

$$4.5 < f_1/f_W < 20$$

where $f_1$ is a focal length of the first lens group, and $f_W$ is the shortest focal length of the zoom lens.

18. The zoom lens of claim 13, wherein the zoom lens satisfies the following formula:

$$32° < \omega_W < 50°$$

where $\omega_W$ is a half angle of view on the condition that the zoom lens is structured to effect the shortest focal length.

19. The zoom lens of claim 18, wherein the zoom lens group comprises three negative lenses and a positive lens arranged in this order from the object.

20. The zoom lens of claim 19, wherein the zoom lens satisfies the following formula:

$$1.5 < f_1/f_W < 20$$

where $f_1$ is a focal length of the first lens group, and $f_W$ is the shortest focal length of the zoom lens.

21. The zoom lens of claim 13, further comprising:

an aperture stop, wherein when the magnification is changed from the shortest focal length to the longest focal length, an aperture diameter of the aperture stop becomes larger.

22. The zoom lens of claim 21, wherein the aperture stop is provided between the second lens group and the third lens group.

23. The zoom lens of claim 13, wherein when the magnification is changed from the shortest focal length to the longest focal length, the first lens group is shifted toward the object once after shifted toward the image.

24. A zoom lens to form an image of an object with variable magnification between a shortest focal length and a longest focal length, comprising:

a first lens group having a positive refracting power;

a second lens group positioned closer to the image than the first lens group and having a negative refracting power; and a third lens group positioned closer to the image than the second lens group and having a positive refracting power;

wherein when the magnification is changed from the shortest focal length to the longest focal length, the third lens group is shifted toward the object and the first lens group and the second lens group are shifted in such a manner that a distance between the first lens group and the second lens group is increased- and a distance between the second lens group and the third lens group is decreased, wherein the third lens group comprises at least a single positive lens and at least a single negative lens, wherein a variable magnification ratio of the zoom lens is four times or more, and wherein the magnification is changed from the shortest focal length to the longest focal length, the first lens group is shifted toward the object once after shifted toward the image.

25. The zoom lens of claim 24, wherein the zoom lens satisfies the following formula:

$$0.25 < f_{3-a} < f_{3-b} < 0.7$$

where $f_{3-a}$ is a focal length of the 3-a lens sub group, and $f_{3-b}$ a focal length of the 3-b lens sub group.

26. The zoom lens of claim 24, wherein the first lens group comprises at least a single positive lens and at least a single negative lens.

27. The zoom lens of claim 24, wherein the zoom lens satisfies the following formula:

$$4.5 < f_1/f_W < 20$$

where $f_1$ is a focal length of the first lens group, and $f_W$ is the shortest focal length of the zoom lens.

28. The zoom lens of claim 24, wherein the zoom lens satisfies the following formula:

$$32° < \omega_W < 50°$$

where $\omega_W$ is a half angle of view on the condition that the zoom lens is structured to effect the shortest focal length.

29. The zoom lens of claim 28, wherein the second lens group comprises three negative lenses and a positive lens arranged in this order from the object.

30. The zoom lens of claim 29, wherein the zoom lens satisfies the following formula:

$$1.5 < f_1/f_W < 20$$

where $f_1$ is a focal length of the first lens group, and $f_W$ is the shortest focal length of the zoom lens.

31. The zoom lens of claim 24, further comprising:

an aperture stop, wherein when the magnification is changed from the shortest focal length to the longest focal length, an aperture diameter of the aperture stop becomes larger.

32. The zoom lens of claim 31, wherein the aperture stop is provided between the second lens group and the third lens group.

33. A zoom lens to form an image of an object with variable magnification between a shortest focal length and a longest focal length, comprising:
a first lens group having a positive refracting power;
a second lens group positioned closer to the image than the first lens group and having a negative refracting power; and
a third lens group positioned closer to the image than the second lens group and having a positive refracting power;
wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased,
wherein the third lens group comprises at least a single positive lens and at least a single negative lens,
wherein a variable magnification ratio of the zoom lens is four times or more, and
wherein the third lens group comprises a 3-a lens sub group having a positive refracting power and a 3-b lens sub group having a positive refracting power and the 3-b lens is shifted so as to conduct focusing.

34. The zoom lens of claim 33, wherein the zoom lens satisfies the following formula:

$$4.5 < f_1/f_W < 20$$

where $f_1$ is a focal length of the first lens group, and
$f_W$ is the shortest focal length of the zoom lens.

35. The zoom lens of claim 33, wherein the zoom lens satisfies the following formula:

$$32° < \omega_W < 50°$$

where $\omega_W$ is a half angle of view on the condition that the zoom lens is structured to effect the shortest focal length.

36. The zoom lens of claim 35, wherein the second lens group comprises three negative lenses and a positive lens arranged in this order from the object.

37. The zoom lens of claim 35, wherein the zoom lens satisfies the following formula:

$$1.5 < f_1/f_W < 20$$

where $f_1$ is a focal length of the first lens group, and
$f_W$ is the shortest focal length of the zoom lens.

38. The zoom lens of claim 33, further comprising:
an aperture stop, wherein when the magnification is changed from the shortest focal length to the longest focal length, an aperture diameter of the aperture stop becomes larger.

39. The zoom lens of claim 38, wherein the aperture stop is provided between the second lens group and the third lens group.

40. The zoom lens of claim 38, wherein the zoom lens satisfies the following formula:

$$0.25 < f_{3-a}/f_{3-b} < 0.7$$

where $f_{3-a}$ is a focal length of the 3-a lens sub group, and
$f_{3-b}$ a focal length of the 3-b lens sub group.

41. A video camera, comprising:
an image pick-up element, and
a zoom lens comprising,
a first lens group having a positive refracting power;
a second lens group positioned closer to the image than the first lens group and having a negative refracting power; and
a third lens group positioned closer to the image than the second lens group and having a positive refracting power;
a fourth lens group positioned closer to the image than the third lens group and having a positive refracting power;
wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased,
wherein the third lens group comprises at least a single positive lens and at least a single negative lens,
wherein a magnification ratio of the zoom lens is four times or more, and
wherein the zoom lens satisfies the following formula:

$$3.3 < \beta_{34T}/\beta_{34W} < 8$$

where $\beta_{34T}$ is a paraxial lateral magnification of the combination of the third lens group and the fourth lens group on the condition that the zoom lens is structured to effect the longest focal length, and
$\beta_{34W}$ is a synthesized paraxial lateral magnification of the combination of the third lens group and the fourth lens group on the condition that the zoom lens is structure to effect the shortest focal length.

42. A digital still camera, comprising:
an image pick-up element, and
a zoom lens comprising,
a first lens group having a positive refracting power;
a second lens group positioned closer to the image than the first lens group and having a negative refracting power;
a third lens group positioned closer to the image than the second lens group and having a positive refracting power; and
a fourth lens group positioned closer to the image than the third lens group and having a positive refracting power;
wherein when the magnification is changed from the shortest focal length to the longest focal length, the third lens group is shifted toward the object and the first lens group and the second lens group are shifted in such a manner that a distance between the first lens group and the second lens group is increased and a distance between the second lens group and the third lens group is decreased,
wherein the third lens group comprises at least a single positive lens and at least a single negative lens,
wherein a magnification ratio of the zoom lens is four times or more, and
wherein the zoom lens satisfies the following formula:

$$3.3 < \beta_{34T}/\beta_{34W} < 8$$

where $\beta_{34T}$ is a paraxial lateral magnification of the combination of the third lens group and the fourth lens group on the condition that the zoom lens is structured to effect the longest focal length, and $\beta_{34W}$ is a synthesized paraxial lateral magnification of the combination of the third lens group and the fourth lens group on the condition that the zoom lens is structure to effect the shortest focal length.

* * * * *